United States Patent
Wake et al.

(10) Patent No.: US 12,001,225 B2
(45) Date of Patent: Jun. 4, 2024

(54) DRONE SYSTEM, DRONE, MOVABLE BODY, DEMARCATING MEMBER, CONTROL METHOD FOR DRONE SYSTEM, AND DRONE SYSTEM CONTROL PROGRAM

(71) Applicant: NILEWORKS INC., Tokyo (JP)

(72) Inventors: Chihiro Wake, Tokyo (JP); Hiroshi Yanagishita, Tokyo (JP)

(73) Assignee: NILEWORKS INC., Tokyo (JP)

( * ) Notice: Subject to any disclaimer, the term of this patent is extended or adjusted under 35 U.S.C. 154(b) by 293 days.

(21) Appl. No.: 17/423,123

(22) PCT Filed: Jan. 15, 2020

(86) PCT No.: PCT/JP2020/000952
§ 371 (c)(1),
(2) Date: Jul. 15, 2021

(87) PCT Pub. No.: WO2020/149275
PCT Pub. Date: Jul. 23, 2020

(65) Prior Publication Data
US 2022/0137642 A1    May 5, 2022

(30) Foreign Application Priority Data
Jan. 16, 2019  (JP) ................................ 2019-004867

(51) Int. Cl.
*G05D 1/00* (2006.01)
*B64C 39/02* (2023.01)
(Continued)

(52) U.S. Cl.
CPC ......... *G05D 1/0684* (2013.01); *B64C 39/024* (2013.01); *B64D 45/04* (2013.01); *G05D 1/0055* (2013.01); *B64U 70/00* (2023.01)

(58) Field of Classification Search
CPC .. G05D 1/0684; G05D 1/0055; G05D 1/0676; B64C 39/024; B64C 13/18;
(Continued)

(56) References Cited

U.S. PATENT DOCUMENTS 10,479,528 B1 * 11/2019 Liang ...................... G07C 9/27
2016/0364989 A1 * 12/2016 Speasl ................. G08G 5/0082
(Continued)

FOREIGN PATENT DOCUMENTS

| CN | 205150244 U | 4/2016 |
|---|---|---|
| CN | 106458238 A | 2/2017 |

(Continued)

OTHER PUBLICATIONS

International Search Report of PCT/JP2020/000952 dated Feb. 25, 2020.
(Continued)

*Primary Examiner* — Muhammad Shafi
(74) *Attorney, Agent, or Firm* — MATTINGLY & MALUR, PC

(57) ABSTRACT

There is provided a drone system in which a drone and a movable body operate in coordination with each other, the movable body being capable of moving with the drone aboard and allowing the drone to make a takeoff and a landing, the drone system includes a demarcating member that demarcates an operation area and detects an intruder into the operation area, the operation area being an area where at least one of the drone and the movable body performs an operation, the movable body includes a movement control section that stops movement of the movable body based on the detection of the intruder by the demarcating member, and the drone includes a landing position determining section that determines a landing position based on a stop position of the movable body.

18 Claims, 14 Drawing Sheets

(51) Int. Cl.
 *B64D 45/04* (2006.01)
 *B64U 70/00* (2023.01)

(58) Field of Classification Search
 CPC .... B64D 45/04; B64U 70/00; B64U 2101/00; B64U 2201/10; B64U 80/86; A01M 7/00; B64F 1/36; G08B 13/19; G08G 1/16; G08G 5/04
 USPC .......................................................... 701/16
 See application file for complete search history.

(56) References Cited

U.S. PATENT DOCUMENTS

| | | | | |
|---|---|---|---|---|
| 2017/0004714 | A1* | 1/2017 | Rhee | G08G 5/0056 |
| 2018/0136651 | A1* | 5/2018 | Levinson | B60W 30/00 |
| 2019/0340924 | A1* | 11/2019 | Abari | G06V 20/58 |

FOREIGN PATENT DOCUMENTS

| | | |
|---|---|---|
| JP | 04-256594 A | 9/1992 |
| JP | 05-146977 A | 6/1993 |
| JP | 2001-120151 A | 5/2001 |
| JP | 2011-076168 A | 4/2011 |
| JP | 2017-163265 A | 9/2017 |
| WO | WO-2018/083942 * | 5/2018 |

OTHER PUBLICATIONS

Chinese Office Action received in corresponding Chinese Application No. 202080007555.2 dated Feb. 21, 2022.

Japanese Office Action received in corresponding Japanese Application No. 2020-566423 dated May 6, 2022.

Japanese Office Action received in corresponding Japanese Application No. 2020-566423 dated Oct. 7, 2022.

* cited by examiner

DRONE SYSTEM, DRONE, MOVABLE BODY, DEMARCATING MEMBER, CONTROL METHOD FOR DRONE SYSTEM, AND DRONE SYSTEM CONTROL PROGRAM

TECHNICAL FIELD

The invention of the present application relates to a drone system, a drone, a movable body, demarcating member, a control method for the drone system, and a drone system control program.

BACKGROUND ART

Application of a small helicopter (multicopter) generally called a drone has progressed. One of important fields of the application is spreading a chemical agent, such as agrochemical and liquid fertilizer, over farmland (an agricultural field) (e.g., see Patent Literature 1). In Japan, where farmlands are narrow as compared with those in Europe and America, using a drone rather than a piloted airplane or helicopter is often suitable.

Thanks to a technology such as a quasi-zenith satellite system and a real time kinematic-global positioning system (RTK-GPS), it is possible to grasp an absolute position of a drone in flight accurately down to several centimeters, thereby enabling autonomous flight with a minimum of manual control and efficient, accurate spreading of a chemical agent even in farmland having a narrow, complicated terrain, which is typically seen in Japan.

On the other hand, as for autonomous flying drones for spreading an agricultural chemical agent, it is difficult to say that consideration is sufficiently given to their safety. A drone equipped with a chemical agent weighs several tens of kilograms, and thus occurrence of an accident such as falling onto a person can cause a serious consequence. In addition, it is necessary to provide a foolproof scheme for drones because an operator of a drone is typically not an expert; however, consideration of such a foolproof system has been insufficient. Hitherto, although there has been a technique for safety of a drone predicated upon control by human (e.g., see Patent Literature 2), there has been no technique for dealing with a safety issue peculiar to an autonomous flying drone for spreading an agricultural chemical agent.

To cause a drone to fly over an agricultural field, a movable body that transports the drone to a predetermined location in the vicinity of the agricultural field is needed. In addition, to allow the drone to take off from and land on the predetermined location, a drone system in which the drone and the movable body exchange information with each other to operate in coordination with each other is needed. To transport the drone, the movable body automatically travels on at least a road on a periphery of an agricultural field, for example, a farm road. In this case, if an intruder such as a human and a car intrudes into an area where the movable body is permitted to travel automatically, a collision or the like may occur. Hence, a system that detects intrusion of an intruder and controls behavior of a movable body is needed.

However, if an operation in an agricultural field by a drone is to be stopped when an intruder intrudes into an area where automatic traveling is permitted, the operation may be delayed. Hence, there is a need for a system that can minimize stoppage of an operation by a drone even in a case where an intruder intrudes into an area where automatic traveling is permitted, so as to improve an operational efficiency of the drone.

Patent Literature 3 discloses an operational area restricting device that prevents robots from intruding into working zones where workers intervene. The operational area restricting device divides a linear movement path for industrial robots into a plurality of working areas and restricts operations of the robots so that the robots do not intrude into the working areas where the workers are working.

Patent Literature 4 discloses a control method for unmanned ground vehicles each performing an operation in a predetermined area. In the control method, the area is divided into a plurality of subareas, sensors for detecting whether a worker intrudes are provided in the subareas, and when one of the sensors detects intrusion of a worker, only an operation of an unmanned ground vehicle in the corresponding area is stopped.

Patent Literature 5 discloses a collision avoidance system for automated guided vehicles. In the system, a place where the automated guided vehicles and humans pass is categorized into a plurality of zones, and the zones are specified, the zones including hazardous zones where a risk of occurrence of a collision is high and predictive zones that is close to the hazardous zones, and the system includes: an alarm device that issues a warning to an automated guided vehicle or a human that intrudes into the predictive zone or the hazardous zone; and a control device that sends a warning issuance signal to the alarm device based on a detection result from detecting means.

However, none of Patent Literatures describes a system including a drone that executes a predetermined operation by automatic flight and a movable body that transports the drone. That is, there is no disclosure of a system that minimizes stoppage of an operation by a drone even in a case where an intruder intrudes into an area where automatic traveling of a movable body is permitted, so as to improve an operational efficiency of the drone.

CITATION LIST

Patent Literature

[Patent Literature 1]
  Japanese Patent Laid-Open No. 2001-120151
[Patent Literature 2]
  Japanese Patent Laid-Open No. 2017-163265
[Patent Literature 3]
  Japanese Patent Laid-Open No. 1992-256594
[Patent Literature 4]
  Japanese Patent Laid-Open No. 1993-146977
[Patent Literature 5]
  Japanese Patent Laid-Open No. 2011-076168

SUMMARY OF INVENTION

Technical Problem

An object of the present invention is to provide a drone system that adjusts, in a system including a drone that executes a predetermined operation through automatic flight and a movable body that transports the drone, a landing position of the drone in accordance with a stop position of the movable body to minimize stoppage of the operation by the drone even in a case where there is an intruder in an area where the movable body is allowed to travel automatically, so as to improve an operational efficiency of the drone.

Solution to Problem

A drone system according to an aspect of the present invention to achieve the objects described above is a drone system in which a drone and a movable body operate in coordination with each other, the movable body being capable of moving with the drone aboard and allowing the drone to make a takeoff and a landing, the drone system including: a demarcating member that demarcates an operation area and detects an intruder into the operation area, the operation area being an area where at least one of the drone and the movable body performs an operation, the movable body includes a movement control section that stops movement of the movable body based on the detection of the intruder by the demarcating member, and the drone includes a landing position determining section that determines a landing position based on a stop position of the movable body.

The demarcating member may further include an exit detection section that detects that the intruder exits the operation area, and the movement control section may be configured to resume the movement of the movable body in response to the exit of the intruder.

The drone system may include a plurality of the demarcating members, and the demarcating members may be each configured to send, to the movable body, information indicating that at least any one of intrusion and exit of the intruder is detected, together with specific information on the demarcating member that detects the intrusion.

The drone may further include a landing position determining section that determines whether the stop position of the movable body is within a region where the drone is able to land on the movable body and that determines that the drone is to land on the movable body in a case where the stop position is within the region where the drone is able to land on the movable body.

The landing position determining section may be configured to determine that the drone is to land at a point other than the movable body in a case where the movable body stops at a position where the drone is unable to land on the movable body.

The landing position determining section may be configured to determine a landing position of the drone at an exit point through which the drone exits the operation area of the drone.

The drone system may include a plurality of the movable bodies, and the landing position determining section may be configured to determine whether a stop position of one of the movable bodies on which the drone is to make a landing is within a region where the drone is able to make the landing.

The demarcating member may further include a movement detection section that detects that the demarcating member is moved, and the movable body may be configured to stop moving in accordance with the movement of the demarcating member.

The movable body may further include an area determining section that determines whether a position of the movable body is within a region where the drone is able to land on the movable body, and a stop position determining section that determines that the movable body is to move to a position where the drone is able to make the landing on the movable body when a distance between the demarcating member that detects the intrusion of the intruder and the movable body is not less than a predetermined value in a case where the movable body is out of a region where the drone is able to make the landing.

The movable body may be configured to determine whether a distance between the demarcating member that detects the intrusion and the movable body is not less than a predetermined value, and the movement control section may be configured to cause the movable body to move to and stop at a position where the drone is able to land on the movable body when a distance between the demarcating member that detects the intrusion of the intruder and the movable body is not less than a predetermined value in a case where the stop position is out of the region where the drone is able to land on the movable body.

The drone may further include an evacuating action determining section that determines that the drone is to take an evacuating action, and the evacuating action determining section may be configured to cause, when a distance between the drone and the demarcating member that detects intrusion is less than a predetermined value, the drone to take an evacuating action, and when the distance between the drone and the demarcating member that detects the intrusion is not less than the predetermined value, the drone to continue an operation.

The drone system may further include a portable terminal capable of issuing a warning to a user, and the portable terminal may be configured, when the demarcating member detects at least any one of intrusion and exit of the intruder, to notify the user of the detection.

The demarcating member and the movable body may each further include a warning section that issues a warning of intrusion of the intruder.

A control method for a drone system according to an aspect of the present invention to achieve the object described above is a control method for a drone system in which a drone and a movable body operate in coordination with each other, the movable body being capable of moving with the drone aboard and allowing the drone to make a takeoff and a landing, the drone system including a demarcating member that demarcates an operation area where at least one of the drone and the movable body performs an operation, the control method including: a step of detecting an intruder into the operation area; a step of stopping movement of the movable body based on the detection of the intruder; and a step of determining a landing position of the drone based on a stop position of the movable body.

A drone system control program according to an aspect of the present invention to achieve the object described above is a control program for a drone system in which a drone and a movable body operate in coordination with each other, the movable body being capable of moving with the drone aboard and allowing the drone to make a takeoff and a landing, the drone system including a demarcating member that demarcates an operation area where at least one of the drone and the movable body performs an operation, the control program causing a computer to execute: a command to detect an intruder into the operation area; a command to stop movement of the movable body based on the detection of the intruder; and a command to determine a landing position of the drone based on a stop position of the movable body.

Note that the computer program may be provided by being download over a network such as the Internet or may be provided by being recorded in various kinds of computer-readable recording media such as a CD-ROM.

A movable body according to an aspect of the present invention to achieve the object described above is a movable body that is included in a drone system in which a drone and the movable body operate in coordination with each other, the movable body being capable of moving with the drone aboard and allowing the drone to make a takeoff and a landing, wherein the drone system includes a demarcating member that demarcates an operation area and detects an intruder into the operation area, the operation area being an area where at least one of the drone and the movable body performs an operation, and the movable body includes a movement control section that stops movement of the movable body based on the detection of the intruder by the demarcating member.

A drone according to an aspect of the present invention to achieve the object described above is a drone that is capable of being moved by being aboard a movable body and capable of taking off from and landing on the movable body, the drone including a demarcating member that demarcates an operation area and detects an intruder into the operation area, the operation area being an area where at least one of the drone and the movable body performs an operation, wherein the movable body stops movement of the movable body based on the detection of the intruder by the demarcating member, and the drone includes a landing position determining section that determines a landing position based on a stop position of the movable body.

A demarcating member according to an aspect of the present invention to achieve the object described above is a demarcating member for a drone system including: a drone; a movable body that is capable of moving with the drone aboard and allows the drone to make a takeoff and a landing; and a demarcating member that demarcates an operation area and detects an intruder into the operation area, the operation area being an area where at least one of the drone and the movable body performs an operation, the demarcating member including an intrusion-exit information transmission section that sends, to the movable body, information on at least one of intrusion and exit of the intruder into and from the operation area.

Advantageous Effect of Invention

In a system including a drone that executes a predetermined operation through automatic flight and a movable body that transports the drone, by adjusting a landing position of the drone in accordance with a stop position of the movable body, it is possible to minimize stoppage of the operation by the drone so that an operational efficiency of the drone can be improved.

DESCRIPTION OF EMBODIMENT

An embodiment for carrying out the invention of the present application will be described below with reference to the drawings. The drawings are all for exemplification purposes. In a detailed description to be made below, specific details will be described for explanation and for helping complete understanding of disclosed embodiments. However, embodiments are not limited to these specific details. In addition, well-known structures and devices are illustrated schematically for simplification of the drawings.

First, a configuration of a drone included in a drone system according to the present invention will be described. In the present specification, a drone refers generally to an aerial vehicle including a plurality of rotary wings irrespective of its type of motive power (electric motor, heat engine, etc.) and its type of control (wireless or wired, autonomous flight or manual control, etc.)

As illustrated in FIG. 1 to FIG. 5, rotary wings 101-1a, 101-1b, 101-2a, 101-2b, 101-3a, 101-3b, 101-4a, and 101-4b (also referred to as rotors) are means for causing a drone 100 to fly, and eight rotary wings (four sets of double-tier rotary wings) are provided, with consideration given to balance of stability of flight, a size of an airframe, and power consumption. The rotary wings 101 are arranged at positions in four directions from a main body 110 of the drone 100, supported by arms extending from the main body 110. That is, in a traveling direction of the drone 100, the rotary wings 101-1a and 101-1b are arranged behind the main body 110 on the left, the rotary wings 101-2a and 101-2b are arranged ahead of the main body 110 on the left, the rotary wings 101-3a and 101-3b are arranged behind the main body 110 on the right, and the rotary wings 101-4a and 101-4b are arranged ahead of the main body 110 on the right. Note that a traveling direction of the drone 100 is a downward direction of the paper of FIG. 1. Below the rotary wings 101, rod-shaped legs 107-1, 107-2, 107-3, and 107-4 extend along rotation axes of the rotary wings 101.

Figure 1:
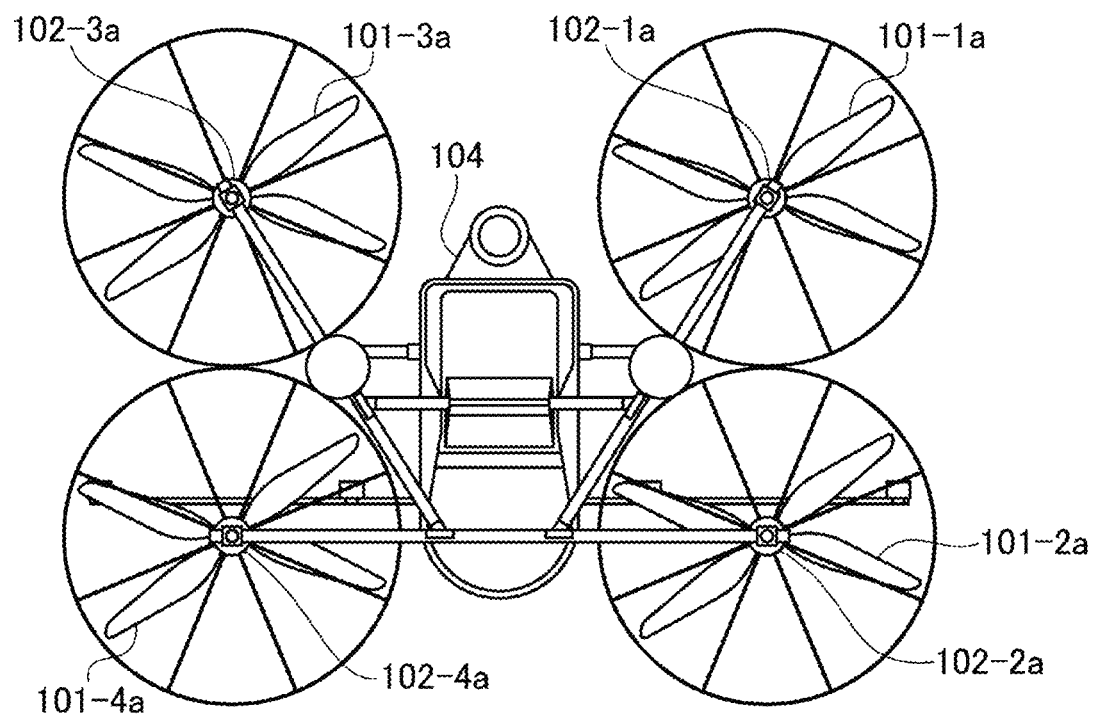
FIG. 1 is a plan view illustrating a first embodiment of a drone system according to the invention of the present application.
Figure 2:
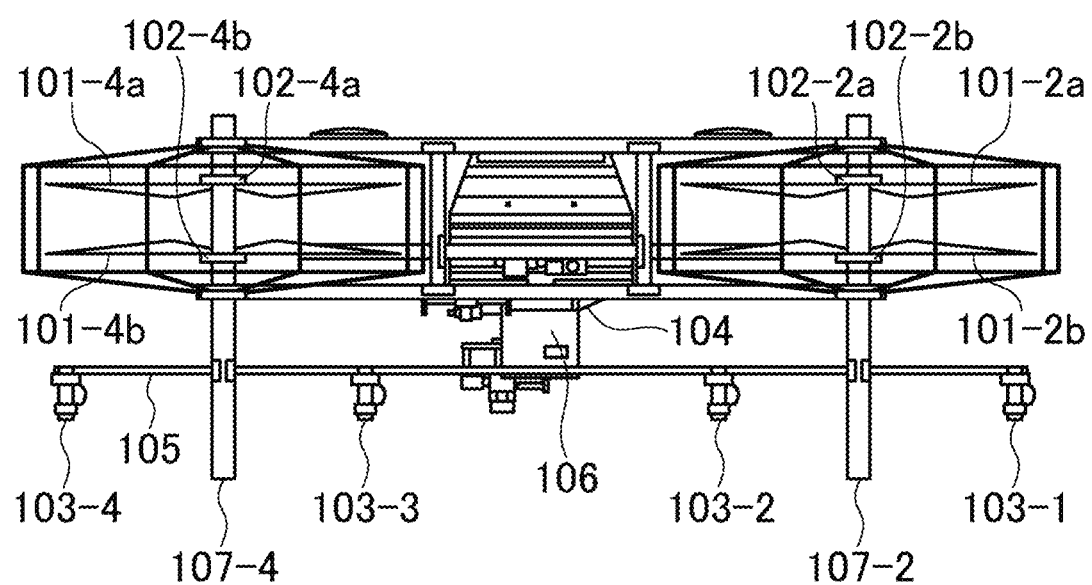
FIG. 2 is a front view of a drone included in the drone system.
Figure 3:
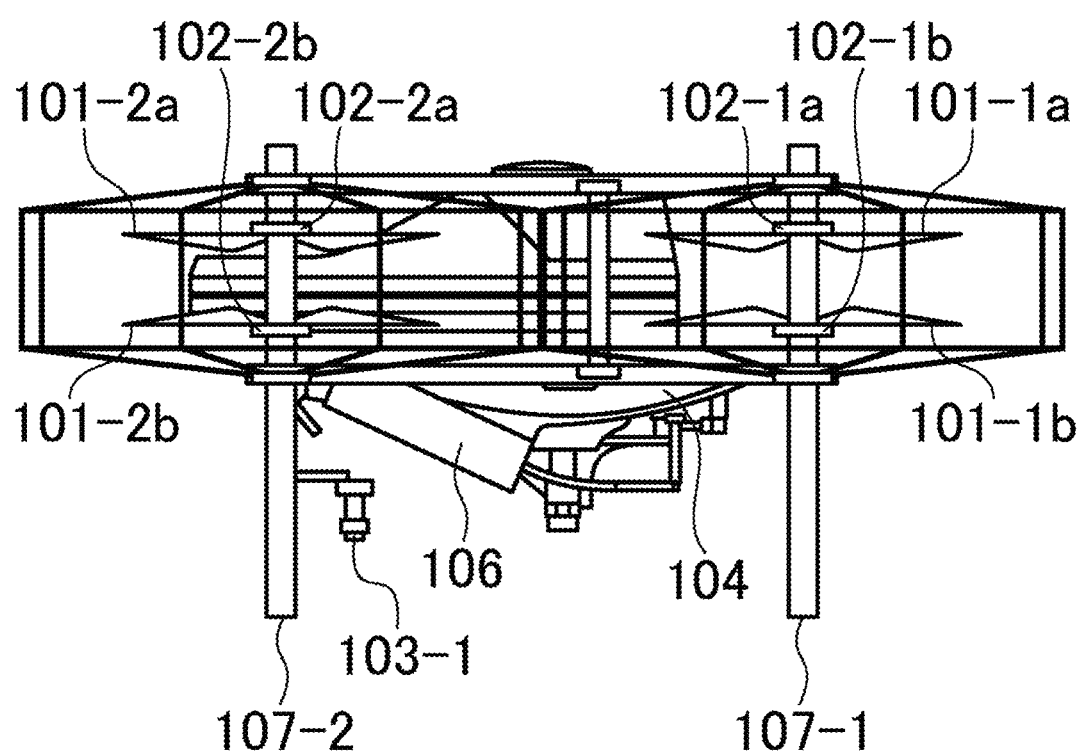
FIG. 3 is a right side view of the drone.
Figure 4:
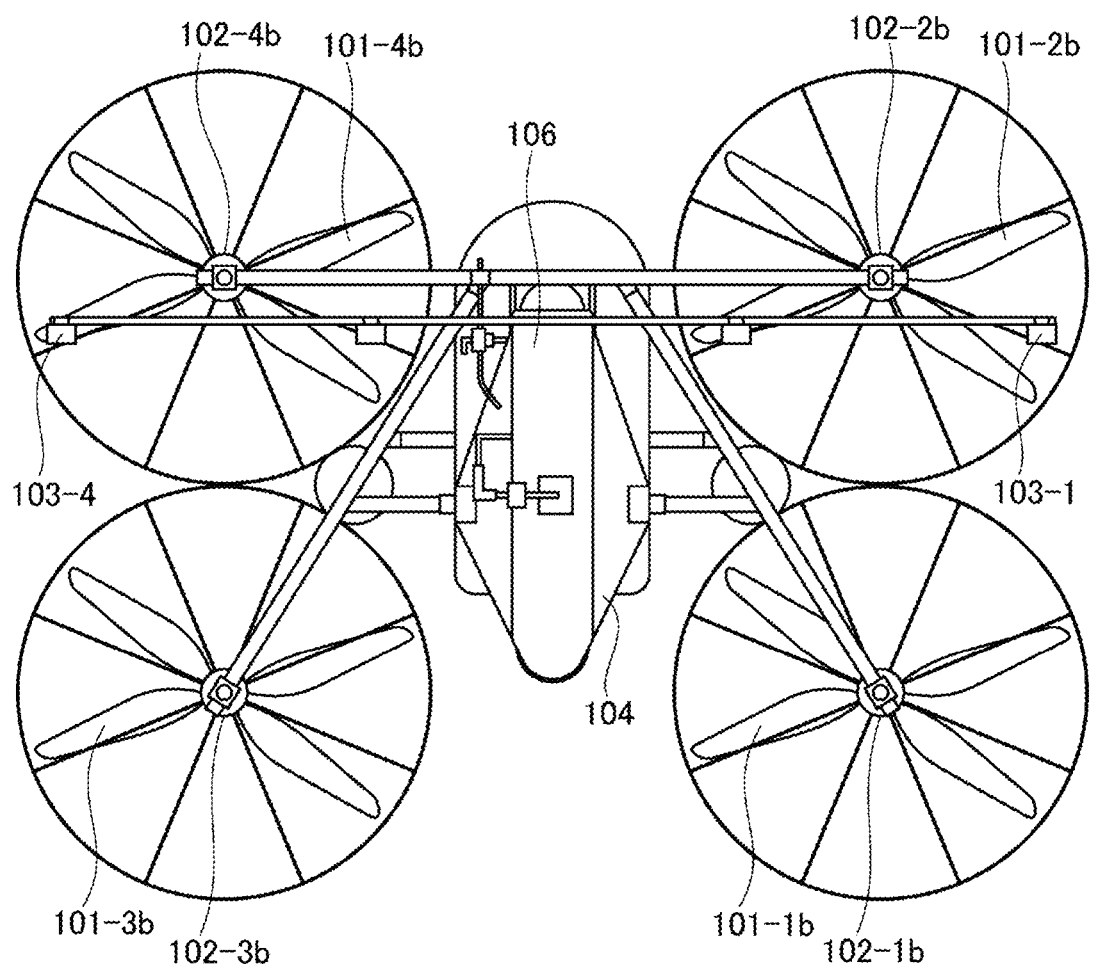
FIG. 4 is a rear view of the drone.
Figure 5:
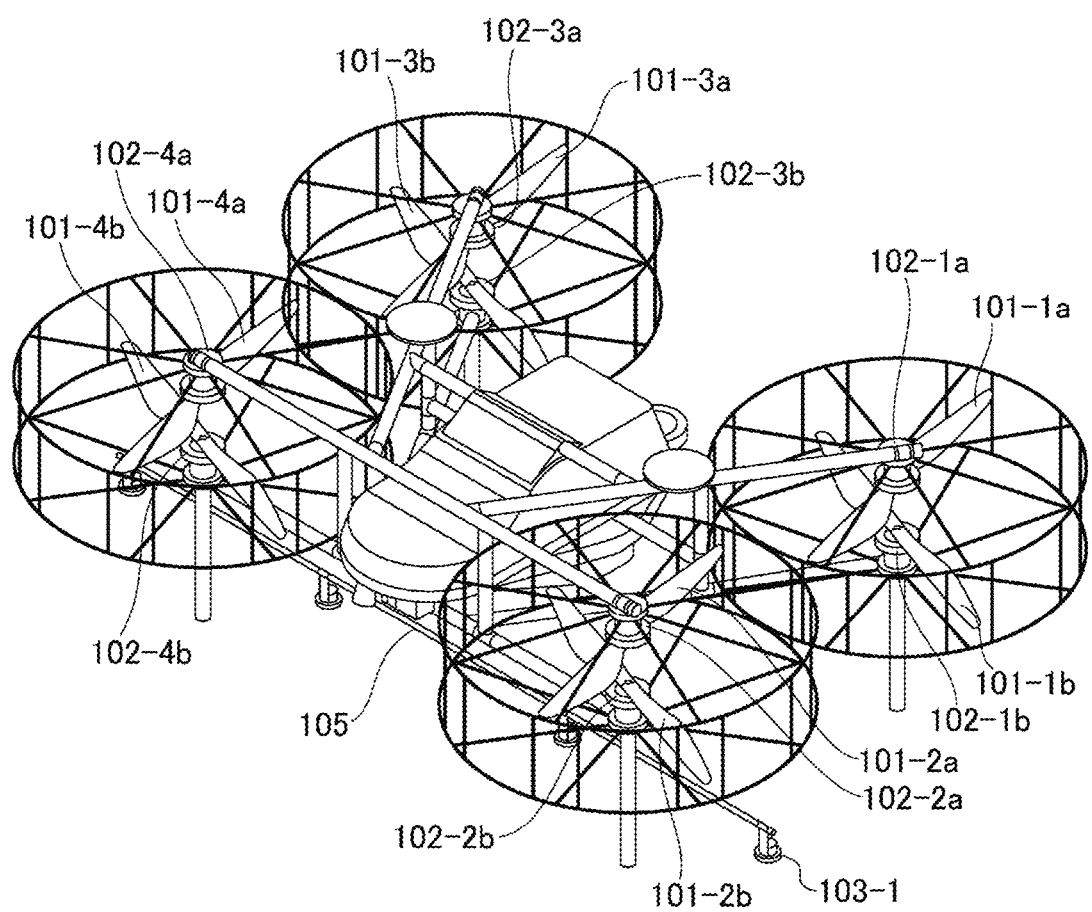
FIG. 5 is a perspective view of the drone.

Motors 102-1a, 102-1b, 102-2a, 102-2b, 102-3a, 102-3b, 102-4a, and 102-4b are means for causing the rotary wings 101-1a, 101-1b, 101-2a, 101-2b, 101-3a, 101-3b, 101-4a, and 101-4b to rotate (typically electric motors but may be engines, etc.), respectively, and are each provided for one rotary wing. The motors 102 are an example of thrusters. Up and down rotary wings of one of the sets (e.g., 101-1a and 101-1b) and their respective motors (e.g., 102-1a and 102-1b) include axes lying on the same line and rotate in directions opposite to each other for stability of flight and the like of the drone. As illustrated in FIG. 2 and FIG. 3, radial members for supporting propeller guards, which are provided to prevent the rotors from interfering with a foreign object, each have a turreted structure rather than a horizontal structure. This is because, in a case of a collision, this structure urges the member to buckle outward of the rotary wing, preventing the member from interfering with the rotor.

Chemical agent nozzles 103-1, 103-2, 103-3, and 103-4 are means for spreading the chemical agent downward, and the number of the chemical agent nozzles provided is four. Note that, in the present specification, a chemical agent refers generally to liquid or powder to be spread over an agricultural field, such as agrochemical, herbicide, liquid fertilizer, insecticide, seeds, and water.

A chemical agent tank 104 is a tank for storing a chemical agent to be spread and is provided at a position close to and below a center of gravity of the drone 100, from a viewpoint of weight balance. Chemical agent hoses 105-1, 105-2, 105-3, and 105-4 are means for connecting the chemical agent tank 104 and the chemical agent nozzles 103-1, 103-2, 103-3, and 103-4, are made of a hard material, and may additionally play a role of supporting the chemical agent nozzles. A pump 106 is means for discharging the chemical agent from the nozzles.

Figure 6:
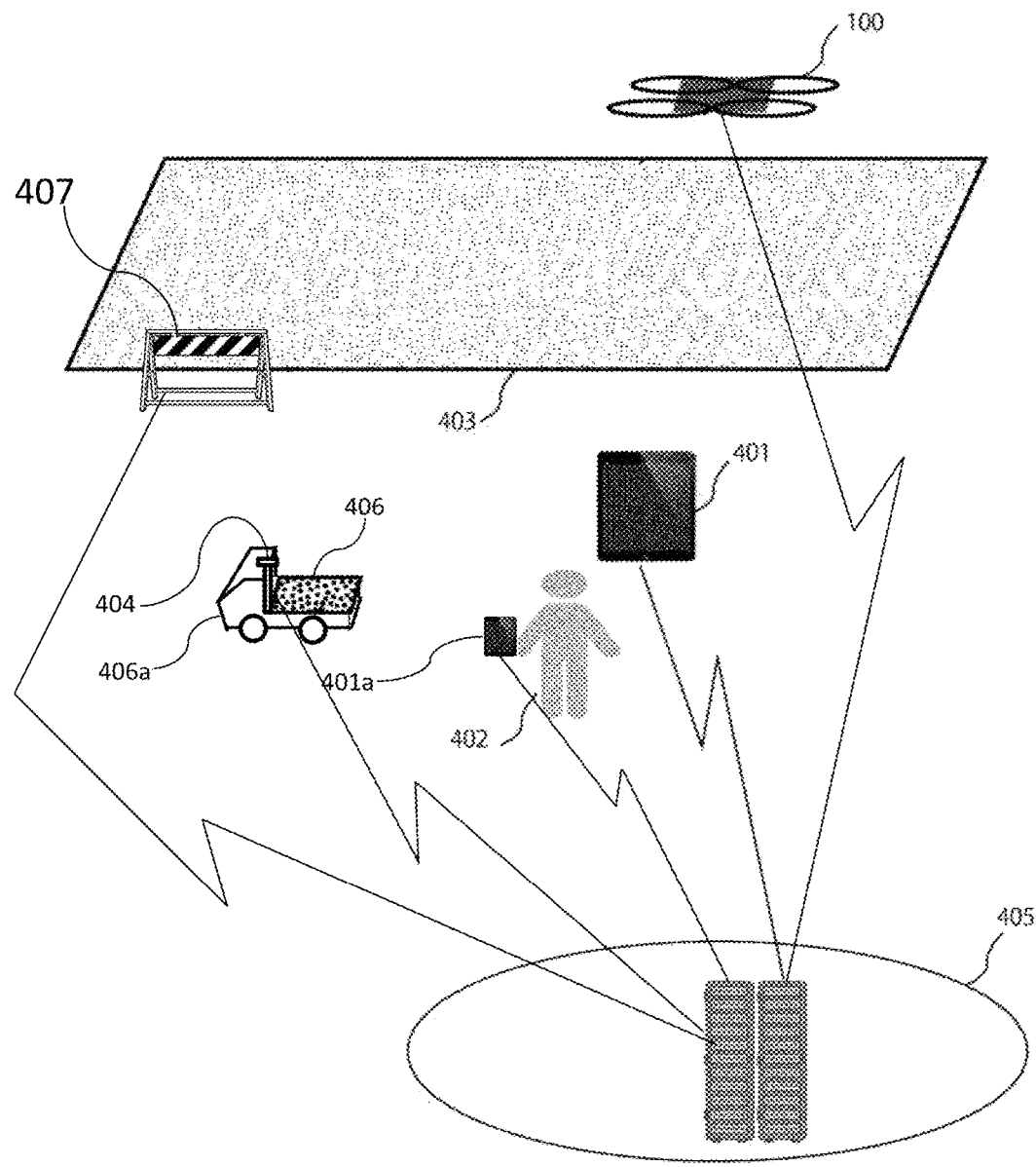
FIG. 6 is a general schematic diagram of a chemical-agent spreading system included in the drone.

FIG. 6 illustrates a general schematic diagram of a system to which an embodiment of the drone 100 according to the invention of the present application in chemical agent spreading use is applied. This figure is schematic, and its scale is not exact. In this figure, the drone 100, an operating device 401, a small portable terminal 401a, a base station 404, a movable body 406a, and a demarcating member 407 are connected to an agriculture cloud 405. These constituents of the system may be connected by wireless communication such as Wi-Fi and a mobile telecommunications system, or some or all of them may be connected in a wired manner.

The drone 100 and the movable body 406a exchange information with each other to operate in coordination with each other. The movable body 406a has the takeoff-landing point 406. The drone 100 includes a flight control section 21 that controls the flight of the drone 100 and a functional section for exchanging information with the movable body 406a.

An operating device 401 is means for sending a command to the drone 100 in response to an operation made by a user 402 and for displaying information received from the drone 100 (e.g., position, amount of chemical agent, remaining battery level, image taken by a camera, etc.) and may be implemented in a form of mobile information equipment such as a typical tablet terminal on which a computer program runs. The drone 100 according to the invention of the present application is controlled so as to perform autonomous flight and may be configured to allow manual operation in basic operations such as a takeoff and a return and in an emergency situation. In addition to the mobile information equipment, an emergency operating device (not illustrated) having a dedicated function of making an emergency stop may be used. The emergency operating device may be dedicated equipment provided with a large emergency stop button or the like for dealing speedily with an emergency situation. Moreover, a small portable terminal 401a, a smartphone for example, capable of displaying some or all of pieces of information displayed on the operating device 401 may be included in the system in addition to the operating device 401. The system may have a function of changing behavior of the drone 100 based on information received from the small portable terminal 401a. The small portable terminal 401a is connected to, for example, the base station 404, being capable of receiving information and the like from the agriculture cloud 405 via the base station 404.

An agricultural field 403 is a rice field, field, or the like that is to be spread with the chemical agent by the drone 100. In reality, topographic features of the agricultural field 403 are complex, and there may be no topographic map that is available in advance, or a given topographic map may disagree with site conditions of the agricultural field 403. The agricultural field 403 may be adjacent to a house, hospital, school, agricultural field of another crop, road, railroad, or the like. In the agricultural field 403, an intruder such as a building, an electric wire, or the like may be present.

The base station 404 is a device providing a host unit function in Wi-Fi communication and the like and may be configured to function also as an RTK-GPS base station to provide an accurate position of the drone 100. In the base station 404, the host unit function in the Wi-Fi communication and the RTK-GPS base station may be implemented in independent devices. The base station 404 may be capable of communicating mutually with the agriculture cloud 405 using a mobile telecommunications system such as 3G, 4G, and LTE. In the present embodiment, the base station 404 is loaded on a movable body 406a together with a takeoff-landing point 406.

An agriculture cloud 405 typically includes computers and relevant software operated on a cloud computing service and may be wirelessly connected to the operating device 401 with a mobile telephone line or the like. The agriculture cloud 405 may analyze images of the agricultural field 403 captured by the drone 100, grasp growth conditions of a crop, and perform processing for determining a flight route. In addition, the agriculture cloud 405 may provide topographic information and the like on the agricultural field 403 stored therein to the drone 100. Moreover, the agriculture cloud 405 may store flights of the drone 100 and images captured by the drone 100 and perform various kinds of analyses thereon.

The demarcating member 407 is a member for demarcating an operation area that includes and surrounds the agricultural field 403 and in which the movable body 406a and the drone 100 move for operation; examples of the demarcating member 407 include color cone (R), a traffic cone, a cone bar, a barricade, a field signboard, a fence, and the like. The demarcating member 407 may make demarcation physically or may make demarcation with a light beam such as an infrared ray. The demarcating member 407 is used to notify mainly an intruder outside the operation area that the area is under operation so as to restrict an intrusion into the operation area. The demarcating member 407 is therefore a member that an intruder can see from a distance. The demarcating member 407 is placed by the user 402 at starting of an operation and thus is preferably easy to place and remove. A plurality of demarcating members 407 may be included in the drone system 500. The demarcating member 407 detects intrusion of an intruder into the operation area and gives information on the intrusion to the movable body 406a, the operating device 401, the small portable terminal 401a, and the like. Note that the intruder includes a human, a vehicle, and other movable bodies.

The small portable terminal 401a is an example of a portable terminal; for example, the small portable terminal 401a is a smartphone or the like. The small portable terminal 401a includes a display section that displays, as appropriate, information on an action predicted in relation to the operation of the drone 100, specifically, a scheduled time at which the drone 100 is to return to the takeoff-landing point 406 and information on details of operations to be performed by the user 402 after the drone 100 returns. Based on an input performed on the small portable terminal 401a, behavior of the drone 100 and the movable body 406a may be changed. The portable terminal is capable of receiving information from both the drone 100 and the movable body 406a. The information from the drone 100 may be sent to the small portable terminal 401a via the movable body 406a.

The small portable terminal 401a has a configuration by which information indicating that an intruder has entered or exited the operation area, the entrance or exit of the intruder being detected by the demarcating member 407, is received and by which a warning is issued to the user 402. The warning is issued in a form of, for example, sound or display. This configuration enables the user 402 having the small portable terminal 401a to obtain the information concerning the intruder even when the user 402 is at a place away from the agricultural field 403.

In general, the drone 100 takes off from the takeoff-landing point 406 located outside the agricultural field 403, spreads the chemical agent over the agricultural field 403, and returns to the takeoff-landing point 406 after the spreading or when replenishment with the chemical agent, electric recharging, or the like is needed. A flight route (entrance route) from the takeoff-landing point 406 to the agricultural field 403 as a destination may be stored in advance in the agriculture cloud 405 or the like or may be input by the user 402 before a takeoff.

Figure 7:
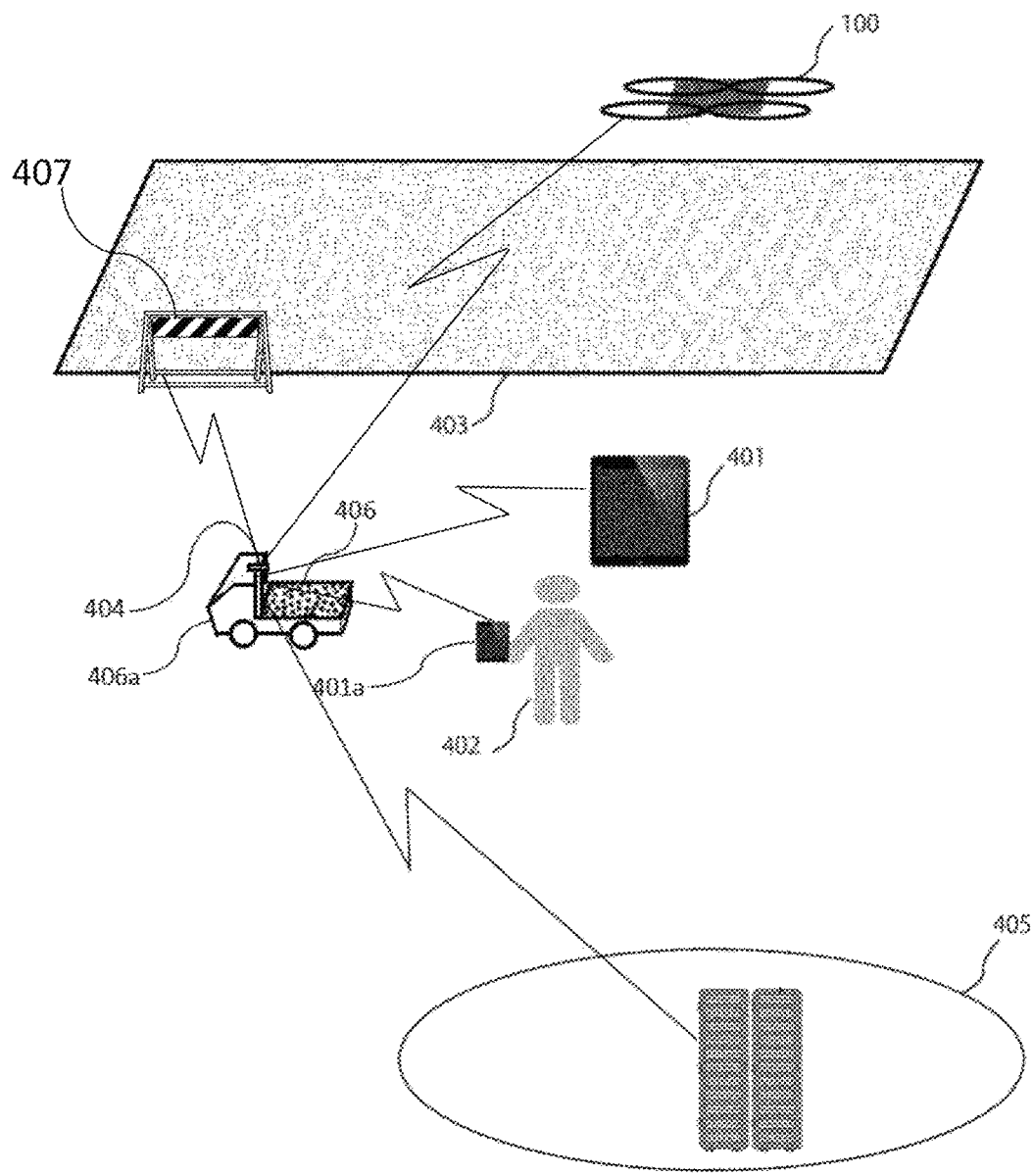
FIG. 7 is a general schematic diagram illustrating a second embodiment of the chemical-agent spreading system included in the drone.

Note that, as in a second embodiment illustrated in FIG. 7, a chemical-agent spreading system with the drone 100 according to the invention of the present application may have a configuration in which the drone 100, the operating device 401, the small portable terminal 401a, the agriculture cloud 405, and the demarcating member 407 are connected to the base station 404.

Figure 8:
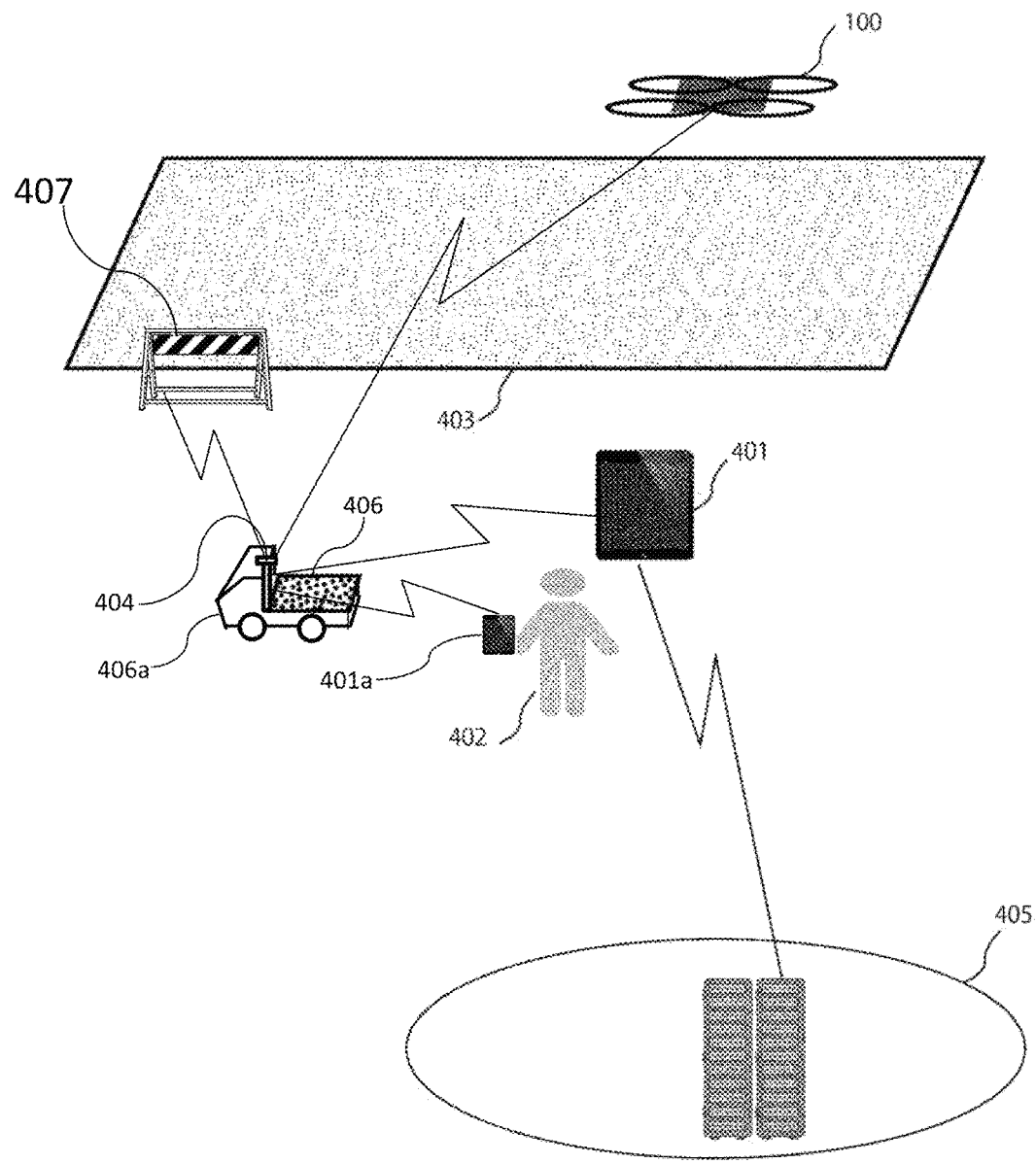
FIG. 8 is a general schematic diagram illustrating a third embodiment of the chemical-agent spreading system included in the drone.

Alternatively, as in a third embodiment illustrated in FIG. 8, the chemical-agent spreading system with the drone 100 according to the invention of the present application may have a configuration in which the drone 100, the operating device 401, the small portable terminal 401a, and the demarcating member 407 are connected to the base station 404, and only the operating device 401 is connected to the agriculture cloud 405.

Figure 9:
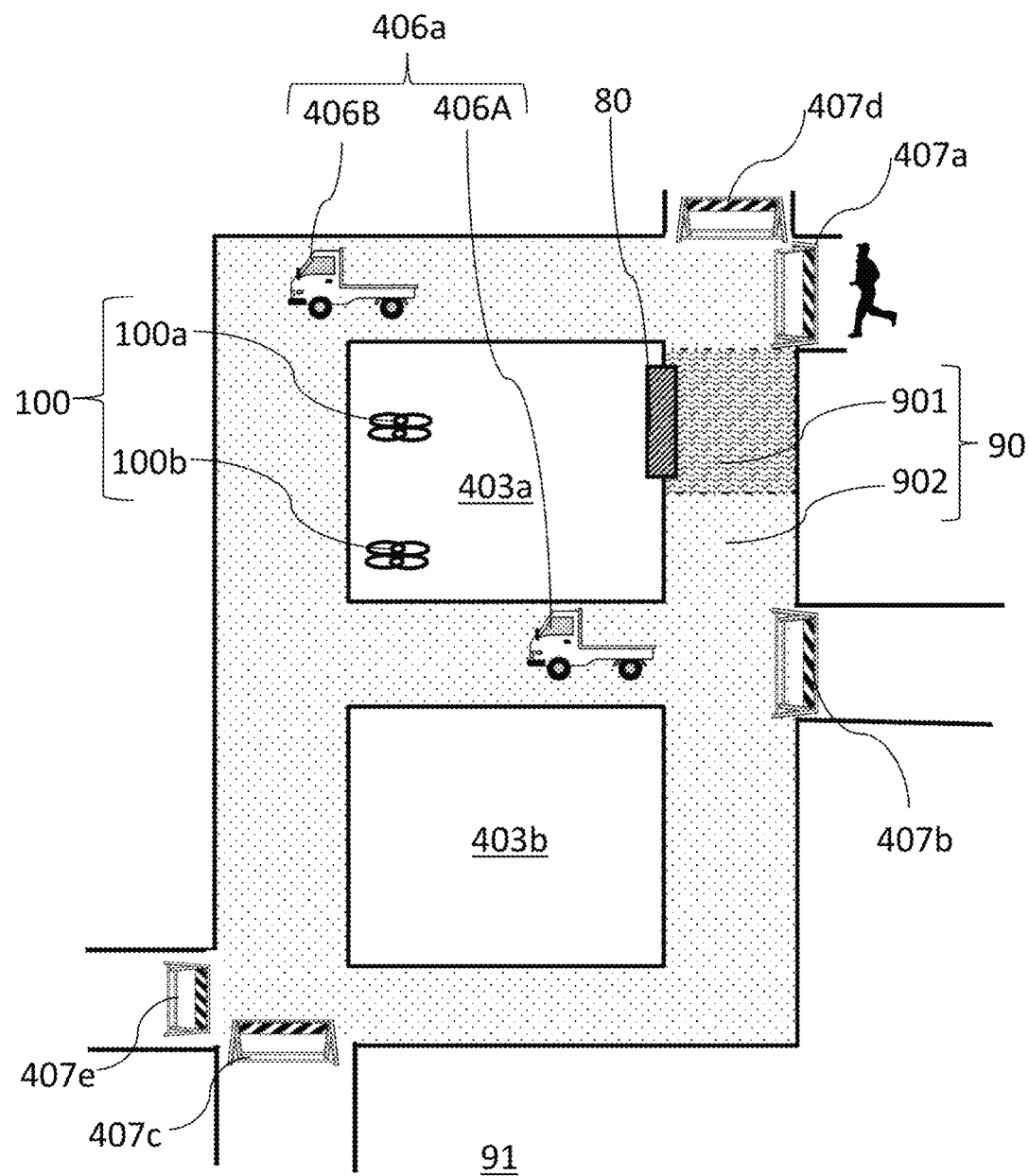
FIG. 9 is a schematic diagram illustrating arrangement of agricultural fields in which the drone performs an operation, an automatic-traveling permitted area where the movable body travels, and demarcating members included in the drone system.

As illustrated in FIG. 9, the drone 100 flies over agricultural fields 403a and 403b to execute an operation in the agricultural fields. The movable body 406a automatically travels in an automated-driving permitted area 90 that is provided around the agricultural fields 403a and 403b. In the technical scope of the present invention, the numbers of drones 100 and movable bodies 406a may be each one or more; in the drawing, two drones 100a and 100b and two movable bodies 406A and 406B are illustrated.

The automated-driving permitted area 90 is, for example, a farm road. The agricultural fields 403a and 403b and the automated-driving permitted area 90 constitute an operation area. The automated-driving permitted area 90 is divided into a movement permitted area 901 where the movable body 406a can move, but the drone 100 cannot make a landing and a landing permitted area 902 where the movable body 406a can move and the drone 100 can land on the movable body 406a. A reason that the drone 100 cannot make a landing is that, for example, an obstacle 80 such as a guardrail, a utility pole, an electric wire, a warehouse, and a tomb is installed between the area and the agricultural field 403a.

The drone 100 takes off from the movable body 406a and executes an operation in the agricultural fields 403a and 403b. During the operation in the agricultural fields 403a and 403b, the drone 100 suspends the operation as appropriate and returns to the movable body 406a, where replenishment with a battery 502 and chemical agent is performed. Upon completion of an operation in a predetermined agricultural field, the drone 100 is moved aboard the movable body 406a to a vicinity of another agricultural field and then takes off from the movable body 406a again to start an operation in the other agricultural field. In this manner, the movement of the drone 100 within the automated-driving permitted area 90 is performed while the drone 100 is aboard the movable body 406a in principle, and the movable body 406a transports the drone 100 to a vicinity of an agricultural field where an operation is to be performed. With this configuration, the battery 502 of the drone 100 can be saved. In addition, since the movable body 406a stores batteries 502 and chemical agent with which the drone 100 can be replenished, a configuration in which the movable body 406a moves to and is on standby at a vicinity of an agricultural field where the drone 100 is in operation, a time necessary for the replenishment of the drone 100 can be shortened.

An outside of the automated-driving permitted area 90 is an automated-driving prohibited area 91. The automated-driving permitted area 90 and the automated-driving prohibited area 91 are separated from each other by demarcating members 407a, 407b, and 407c. The automated-driving permitted area 90 and the automated-driving prohibited area 91 are separated from each other by various obstacles; additionally, the demarcating members 407a, 407b, and 407c may be arranged on roads that are formed continuously. In other words, the demarcating members 407a, 407b, and 407c are arranged at entrances to the automated-driving permitted area 90.

Figure 10:
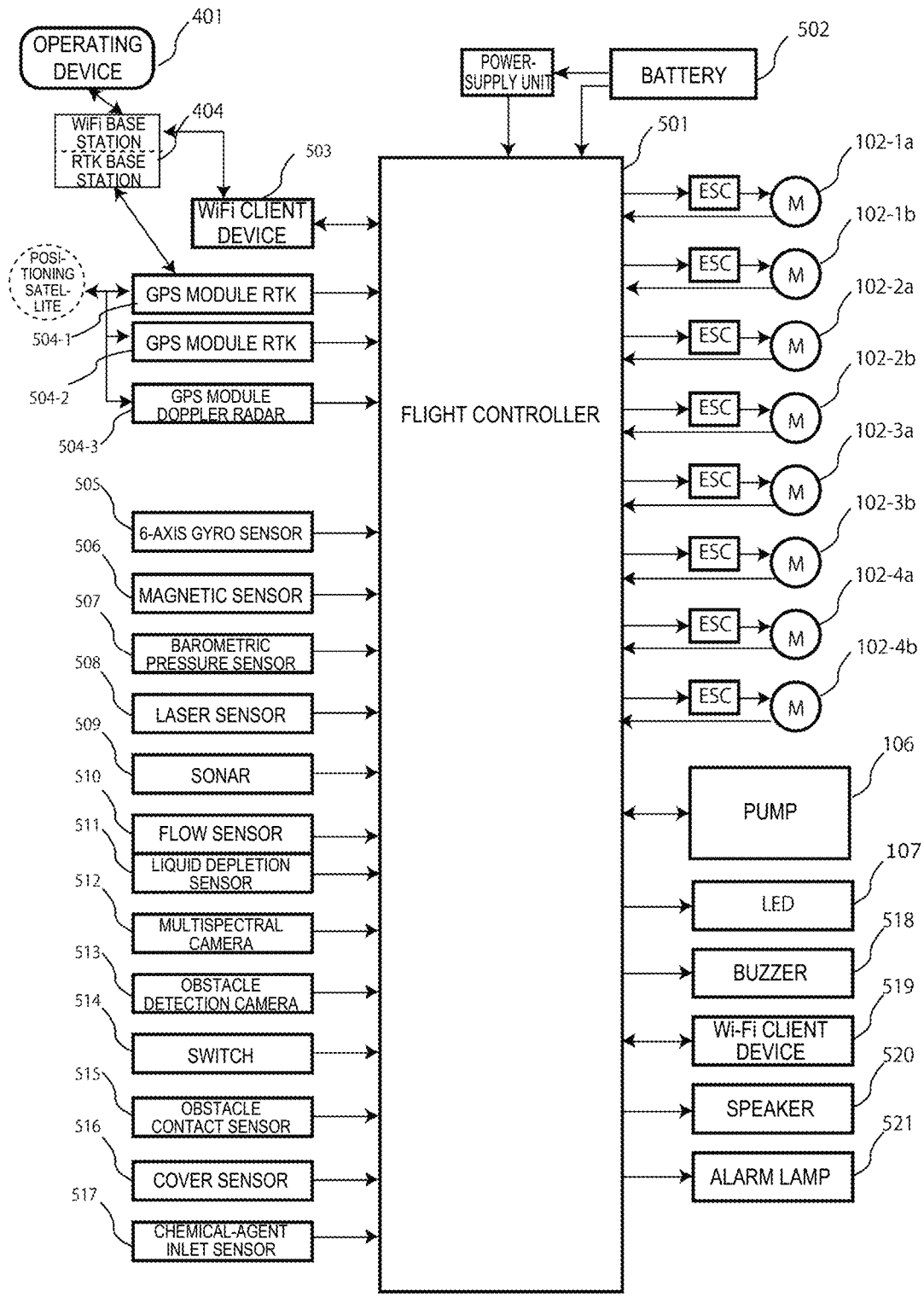
FIG. 10 is a schematic diagram illustrating control functions of the drone.

FIG. 10 is a block diagram illustrating control functions in an embodiment of a drone for spreading chemical agent according to the invention of the present application. A flight controller 501 is a constituent component that governs control of the entire drone; specifically, the flight controller 501 may be an embedded computer including a CPU, a memory, relevant software, and the like. The flight controller 501 controls a flight of the drone 100 by controlling the numbers of revolutions of the motors 102-1a, 102-1b, 102-2a, 102-2b, 102-3a, 102-3b, 104-a, and 104-b via control means such as electronic speed controls (ESCs) based on input information received from the operating device 401 and input information obtained from various kinds of sensors described later. The flight controller 501 is configured to receive feedback on actual numbers of revolutions of the motors 102-1a, 102-1b, 102-2a, 102-2b, 102-3a, 102-3b, 104-a, and 104-b so as to monitor whether their rotations are normal. Alternatively, the flight controller 501 may be configured to receive feedback on the rotations of the rotary wings 101 from optical sensors or the like provided to the rotary wings 101.

Software used for the flight controller 501 can be rewritten for enhancement/modification of a function, fixing a problem, or the like via a storage medium or the like or communication means such as Wi-Fi communication and USB. In this case, the software is protected by encryption, checksum, digital signature, virus-check software, and the like so as not to be rewritten by fraudulent software. In addition, calculation processing used by the flight controller 501 for the control may be partly executed by the operating device 401 or another computer that is present on the agriculture cloud 405 or at another location. Some or all of the constituent components of the flight controller 501 may be duplexed owing to its great importance.

The flight controller 501 can receive a necessary command from the operating device 401 and send necessary information to the operating device 401 by exchanging data with the operating device 401 via a Wi-Fi client unit function 503 and additionally the base station 404. In this case, the communication may be encrypted to prevent fraudulent activities such as interception, spoofing, and hacking a device. The base station 404 has a communication function using Wi-Fi as well as a function of an RTK-GPS base station. By combining signals from the RTK base station and signals from GPS satellites, an absolute position of the drone 100 can be measured with a precision of about several centimeters by the flight controller 501. The flight controller 501 may be duplexed/multiplexed owing to their great importance; in addition, redundant flight controllers 501 may be controlled to use different satellites so as to prepare for failure of some GPS satellite.

A 6-axis gyro sensor 505 is means for measuring accelerations of an airframe of the drone in three directions orthogonal to one another, and additionally, means for calculating velocities by integrating the accelerations. The 6-axis gyro sensor 505 is means for measuring changes in attitude angles, namely, angular velocities, of the airframe of the drone in the three directions described above. A geomagnetic sensor 506 is means for measuring a direction of the airframe of the drone by measuring the Earth's magnetic field. A barometric pressure sensor 507 is means for measuring barometric pressure; the barometric pressure sensor 507 can also measure an altitude of the drone indirectly. A laser sensor 508 is means for measuring a distance between the drone airframe and the Earth's surface by using reflection of laser light; the laser sensor 508 may use infrared (IR) laser. A sonar 509 is means for measuring a distance between the airframe of the drone and the Earth's surface by using reflection of a sound wave such as an ultrasonic wave. These sensors and the like may be selected in accordance with a cost target and performance requirements of the drone. In addition, a gyro sensor (angular velocity sensor) for measuring an inclination of the airframe, an anemometer sensor for measuring a force of wind, and the like may be added. These sensors and the like may be duplexed or multiplexed. In a case where there are a plurality of sensors provided for the same purpose, the flight controller 501 may use only one of the sensors, and if a failure occurs in the one sensor, another one of the sensors may be switched to and used as an alternative sensor. Alternatively, the plurality of sensors may be used simultaneously, and the flight controller 501 may be configured to deem that a failure occurs if measurement results from the sensors disagree.

Flow sensors 510 are means for measuring flow rates of the chemical agent and are provided at a plurality of locations on channels from the chemical agent tank 104 to the chemical agent nozzles 103. A liquid depletion sensor 511 is a sensor for sensing whether an amount of the chemical agent falls to or below a predetermined amount. A multispectral camera 512 is means for capturing an image of the agricultural field 403 to acquire data to be used for image analysis. An intruder detection camera 513 is a camera for detecting an intruder for the drone; the intruder detection camera 513 is a device of a different kind from that of the multispectral camera 512 because its image properties and an orientation of its lens are different from those of the multispectral camera 512. A switch 514 is means with which the user 402 of the drone 100 makes various settings. An intruder contact sensor 515 is a sensor for detecting that the drone 100, particularly a portion of its rotor or its propeller guard has come into contact with an intruder such as an electric wire, a building, a human body, a tree, a bird, and another drone. Note that the 6-axis gyro sensor 505 may substitute for the intruder contact sensor 515. A cover sensor 516 is a sensor for detecting that a cover of an operation panel or a cover for an internal maintenance of the drone 100 is in an open state. A chemical-agent inlet sensor 517 is a sensor for detecting that an inlet of the chemical agent tank 104 is in an open state. These sensors and the like may be selected in accordance with a cost target and performance requirements of the drone and may be duplexed or multiplexed. In addition, a sensor may be provided in the base station 404, the operating device 401, or another location outside of the drone 100, and information read by the sensor may be sent to the drone. For example, an anemometer sensor may be provided in the base station 404, and information concerning a force and a direction of wind may be sent to the drone 100 via Wi-Fi communication.

The flight controller 501 sends a control signal to the pump 106 to adjust an amount of the chemical agent to be discharged or stop discharging the chemical agent. The flight controller 501 is configured to receive feedback on current conditions (e.g., the number of revolutions) of the pump 106.

An LED 107 is display means for informing an operator of the drone of a state of the drone. In place of or in addition to the LED, display means such as a liquid crystal display may be used. A buzzer 518 is output means for indicating the state (particularly an error state) of the drone using an aural signal. A Wi-Fi client unit function 519 is an optional constituent component that communicates with an external computer or the like to transfer, for example, software separately from the operating device 401. In place of or in addition to the Wi-Fi client unit function, other kinds of wireless communication means such as infrared communication, Bluetooth (R), ZigBee (R), and NFC, or wired communication means such as USB connection may be used. In place of the Wi-Fi client unit function, a mobile telecommunications system such as 3G, 4G, and LTE may be used to enable the drone and the external computer to communicate with each other. A speaker 520 is output means for indicating the state (particularly an error state) of the drone using recorded human voice, synthesized voice, or the like. In some weather conditions, a visual display by the drone 100 during flight is difficult to see; in this case, using voice to transmit the state is effective. An alarm lamp 521 is display means such as a strobe light for indicating the state (particularly an error state) of the drone. These kinds of input/output means may be selected in accordance with a cost target and performance requirements of the drone and may be duplexed or multiplexed.

Configuration of Movable Body

Figure 11:
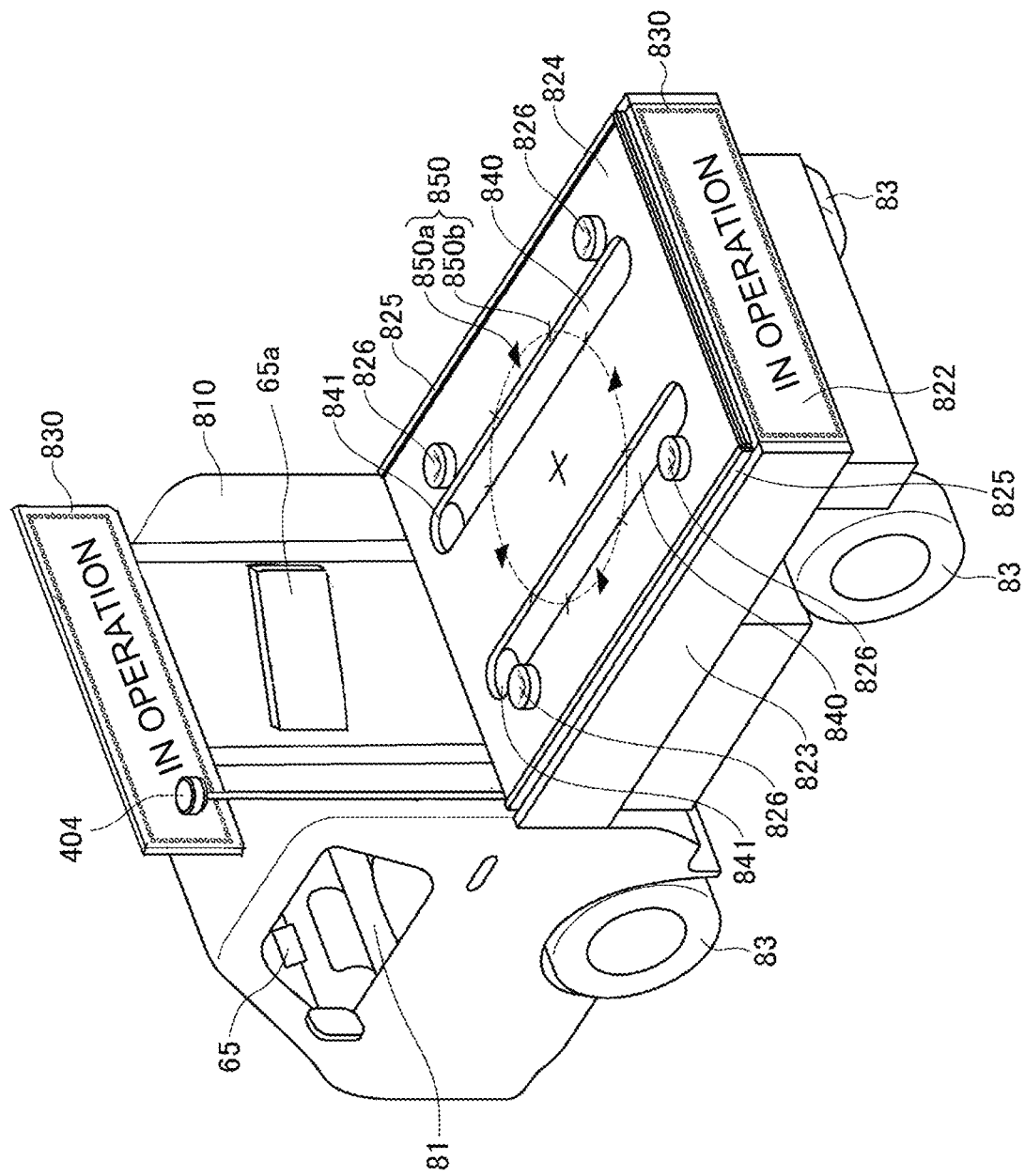
FIG. 11 is a schematic perspective view of a scene of a movable body according to the invention of the present application.
Figure 12:
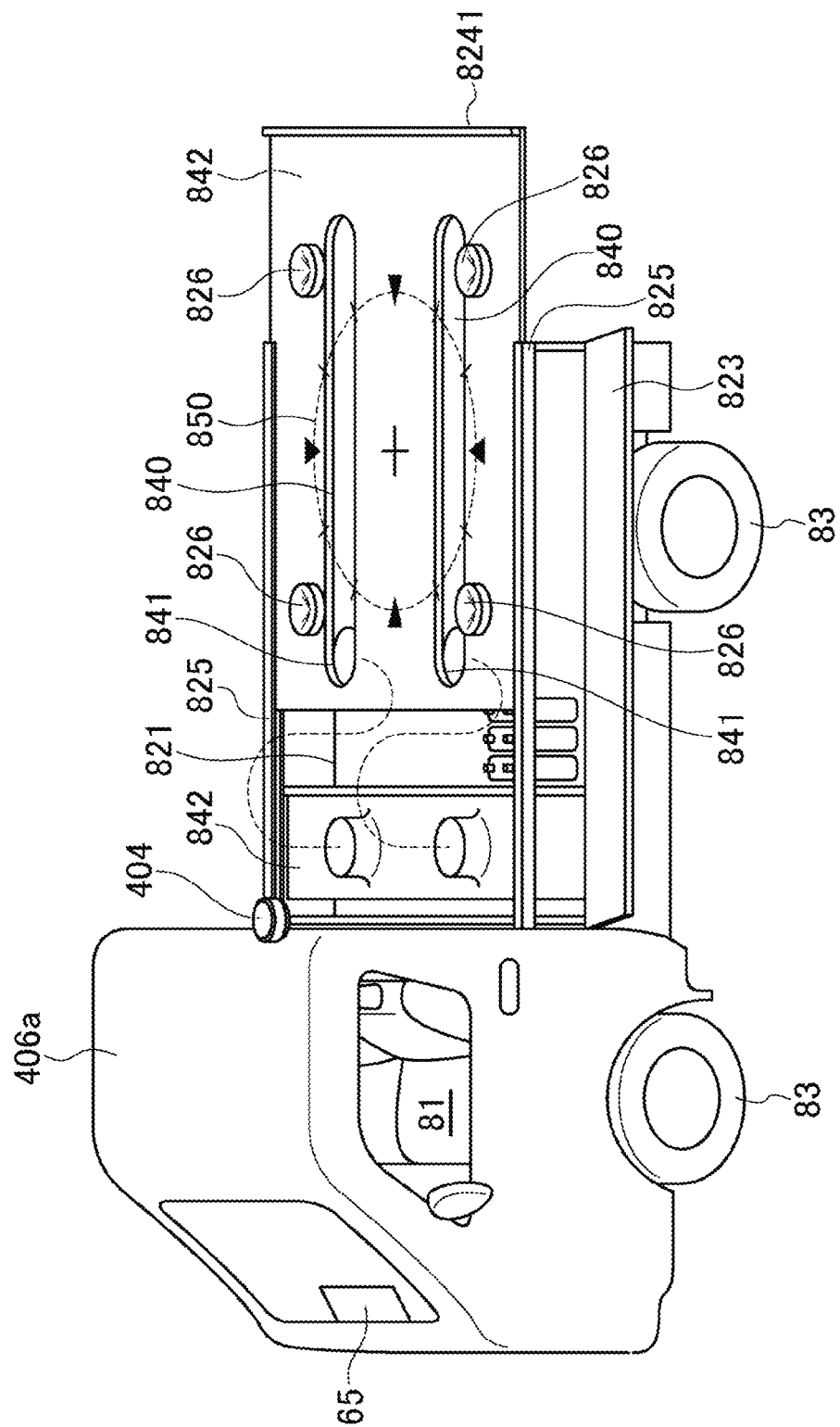
FIG. 12 is a schematic perspective view of the movable body illustrating how an upper plate on which the drone is placed is slid rearward.

The movable body 406a illustrated in FIG. 11 and FIG. 12 is an apparatus that receives information possessed by the drone 100 and notifies the user 402 of the information as appropriate, and that accepts an input from the user 402 and sends the input to the drone 100. In addition, the movable body 406a is capable of moving with the drone 100 aboard. The movable body 406a is capable of being driven by the user 402 and may be capable of moving autonomously. Although the movable body 406a in the present embodiment is assumed to be a vehicle such as an automobile, more specifically a mini truck, the movable body 406a may be an appropriate land movable body such as a railroad car or may be a boat or an aerial vehicle. The movable body 406a may be driven by an appropriate driving source such as gasoline, electricity, and fuel cells.

The movable body 406a is a vehicle in which an occupant seat 81 is arranged on a front side of the vehicle in its traveling direction and a platform 82 on a rear side of the vehicle in the traveling direction. On a bottom side of the movable body 406a, four wheels 83 are arranged to be capable of being driven, as an example of moving means. The occupant seat 81 allows the user 402 to sit thereon.

In a vicinity of the occupant seat 81, a display section 65 that displays the movable body 406a and a state of the drone 100 is arranged. The display section 65 may be a device with a screen or may be implemented as a mechanism that projects information onto a windshield. In addition to the display section 65, a back-side display section 65a may be installed on a back side of a vehicle body 810 with which the occupant seat 81 is covered. With respect to the vehicle body 810, an angle of the back-side display section 65a can be changed laterally, and the user 402 working on a rear side or a lateral side of the platform 82 can acquire information by watching a screen of the rear-side display section 65a.

At a front left corner of the platform 82 of the movable body 406a, the base station 404, which has a shape made by joining a disk-like member to an upper end of a round bar, extends upward to be higher than the occupant seat 81. Note that the base station 404 may have any shape and may be located at any position. With the configuration in which the base station 404 is located on the occupant seat 81 side of the platform 82, the base station 404 is unlikely to hinder the drone 100 from making a takeoff and a landing, as compared with a configuration in which the base station 404 is located on a rear side of the platform 82.

The platform 82 has a trunk 821 for storing a battery 502 for the drone 100 and chemical agent with which the chemical agent tank 104 of the drone 100 is to be replenished. The trunk 821 is a space surrounded by the vehicle body 810 with which the occupant seat 81 is covered, a rear plate 822, a pair of side plates 823 and 823, and an upper plate 824. The rear plate 822 and the side plates 823 are also called "gates". On upper portions of both edges of the rear plate 822, rails 825 are disposed, extending along upper edges of the side plates 823 up to the vehicle body 810 on the back side of the occupant seat 81. The upper plate 824 serves as a takeoff-landing area being the takeoff-landing point 406, which allows the drone 100 to be placed thereon and to make a takeoff and a landing; the upper plate 824 is slidable forward and backward in the traveling direction along the rails 825. The rails 825 serve as ribs that protrude upward from a plane of the upper plate 824, preventing the drone 100 placed on the upper plate 824 from slipping out of right and left edges of the movable body 406a. In addition, the upper plate 824 is formed with a rib 8241 that protrudes upward to the same extent as the rails 825.

At an upper portion of the vehicle body 810 and on a rear side of the rear plate 822 in the traveling direction, an electronic warning board 830 displaying a notice of the drone system 500 being in operation may be arranged. The electronic warning board 830 may be a display that distinguishingly displays a notice of the drone 100 being in operation and a notice of the drone 100 being out of operation by using colors, turning on and off, or the like, or may be capable of displaying characters or pictures. The electronic warning board 830 at the upper portion of the vehicle body 810 may be capable of stretching up above the vehicle body 810 and providing a display on both sides of the electronic warning board 830. With this configuration, a warning can be visually recognized from the rear even when the drone 100 is placed on the platform 82. In addition, the warning can be visually recognized from ahead of the movable body 406a in the traveling direction. With the electronic warning board 830 that can be visually recognized from the front and the rear, time and trouble to place the demarcating members 407 can be partially saved.

The upper plate 824 may be manually slidable or may automatically slide by a rack-and-pinion mechanism or the like. After the upper plate 824 is slid rearward, an item can be put into the trunk 821 from above the platform 82 or can be taken out from the trunk 821. In a mode where the upper plate 824 is slid rearward, the upper plate 824 and the vehicle body 810 are sufficiently separated from each other, and thus the drone 100 can take off from and land on the takeoff-landing point 406.

On the upper plate 824, four leg receiving members 826 to which the legs 107-1, 107-2, 107-3, and 107-4 of the drone 100 can be fixed are arranged. The leg receiving members 826 are, for example, disk-like members that are placed at positions corresponding to the four legs 107-1, 107-2, 107-3, and 107-4 of the drone 100, and each of which has an upper face that recesses in a truncated-cone shape. Bottoms of truncated-cone-shaped recesses of the leg receiving members 826 and tips of the legs 107-1, 107-2, 107-3, and 107-4 may be shaped such that each bottom and a corresponding tip fit together. When landing on the leg receiving members 826, the legs 107-1, 107-2, 107-3, and 107-4 of the drone 100 slide on conical surfaces of the leg receiving members 826, so that tips of the legs 107-1, 107-2, 107-3, and 107-4 are guided to bottom portions of the truncated cones. The drone 100 can be fixed to the leg receiving members 826 automatically or manually by an appropriate mechanism, so that when the movable body 406a moves with the drone 100 aboard, the drone 100 can be transported safely without excessively shaken or dropped. The movable body 406a can sense whether the drone 100 is fixed to the leg receiving members 826.

Substantially at a center portion of the upper plate 824, a circle light 850 that displays a guide to a takeoff-landing position for the drone 100 is arranged. The circle light 850 is formed with lamps that are arranged substantially in a circular pattern, and the lamps can each turn on and off individually. In the present embodiment, a circle light 850 is constituted of four large lamps 850a that are arranged every about 90 degrees on the circumference and small lamps 850b every two of which are arranged between adjacent large lamps 850a. The circle light 850 displays a flying direction after the drone 100 makes a takeoff or a flying direction in which the drone 100 makes a landing by lighting one or more of the lamps 850a and 850b. The circle light 850 may be constituted of one annular lamp that can partly turn on or off.

The pair of side plates 823 is coupled to the platform 82 at its bottom edges with hinges, by which the side plates 823 can be laid down outward. FIG. 9 illustrates how a side plate 823 on the left side in the traveling direction is laid down outward. After the side plate 823 is laid down outward, it is possible to put an item to be stored or take out a stored item through a lateral side of the movable body 406a. The side plates 823 can be fixed to be substantially parallel to a bottom face of the trunk 821, so that the side plates 823 are available as workbenches.

A pair of the rails 825 forms a mode switching mechanism. The hinges used to couple the side plates 823 to the platform 82 may be included in the mode switching mechanism. In a mode in which the upper plate 824 is arranged to cover above the trunk 821, and the side plates 823 are erected to cover lateral faces of the trunk 821, the movable body 406a moves. When the movable body 406a is at a stationary, the movable body 406*a* can be switched to a mode in which the upper plate 824 is slid rearward or a mode in which the side plates 823 are laid down, where the user 402 can approach an inside of the trunk 821.

While the drone 100 is on the takeoff-landing point 406, replenishment with a battery 502 can be performed. The replenishment with a battery 502 includes charging the battery 502 built in and replacing the battery 502. In the trunk 821, a charging device for batteries 502 is stored and can charge batteries 502 stored in the trunk 821. Alternatively, the drone 100 may include a mechanism of an ultracapacitor in place of the battery 502, and a charger for the ultracapacitor may be stored in the trunk 821. In this configuration, while the drone 100 is fixed to the leg receiving members 826, the battery 502 equipped with the drone 100 can be fast-charged via the legs of the drone 100.

While the drone 100 is on the takeoff-landing point 406, the chemical agent tank 104 can be replenished with chemical agent to be reserved in the chemical agent tank 104. In the trunk 821, appropriate constituent components for dilution and mixing may be stored, such as a dilution-mixing tank for diluting and mixing chemical agent, a stirring mechanism, a pump and a hose for sucking the chemical agent from the dilution-mixing tank and pouring the chemical agent into the chemical agent tank 104. In addition, a replenishment hose that extends upward from the trunk 821 above the upper plate 824 and can be connected to an inlet of the chemical agent tank 104 may be provided.

On an upper-surface side of the upper plate 824, liquid-waste ditches 840 and liquid-waste holes 841 that guide chemical agent discharged from the chemical agent tank 104 are formed. The numbers of the liquid-waste ditches 840 and liquid-waste holes 841 arranged are each two, so that a liquid-waste ditch 840 is located below the chemical agent nozzles 103 irrespective of whether the drone 100 lands on the movable body 406*a* facing the right or the left. The liquid-waste ditches 840 are ditches with a predetermined width that are formed substantially straight, pass positions of the chemical agent nozzles 103, extend along a lengthwise direction of the movable body 406*a*, and are slightly inclined toward the occupant seat 81. At ends of the liquid-waste ditches 840 on the occupant seat 81 side, the liquid-waste holes 841 that penetrate the upper plate 824 to guide chemical solution into the inside of the trunk 821 are provided. The liquid-waste holes 841 communicate with a liquid-waste tank 842 that is installed inside the trunk 821 and substantially directly below the liquid-waste holes 841.

Before chemical agent is poured into the chemical agent tank 104, an air bleeding operation to discharge gas, mainly air, filling the chemical agent tank 104 to the outside is performed. At this time, an operation to discharge chemical agent from an outlet of the chemical agent tank 104 is needed. In addition, after the drone 100 completes its operation, an operation to discharge chemical agent from the chemical agent tank 104 is needed. With the configuration in which the upper plate 824 is formed with the liquid-waste ditches 840 and the liquid-waste holes 841, when chemical agent is poured into or discharged from the chemical agent tank 104 while the drone 100 is placed on the upper plate 824, liquid waste can be guided to the liquid-waste tank 842, so that the chemical agent can be poured and discharged safely.

Figure 13:
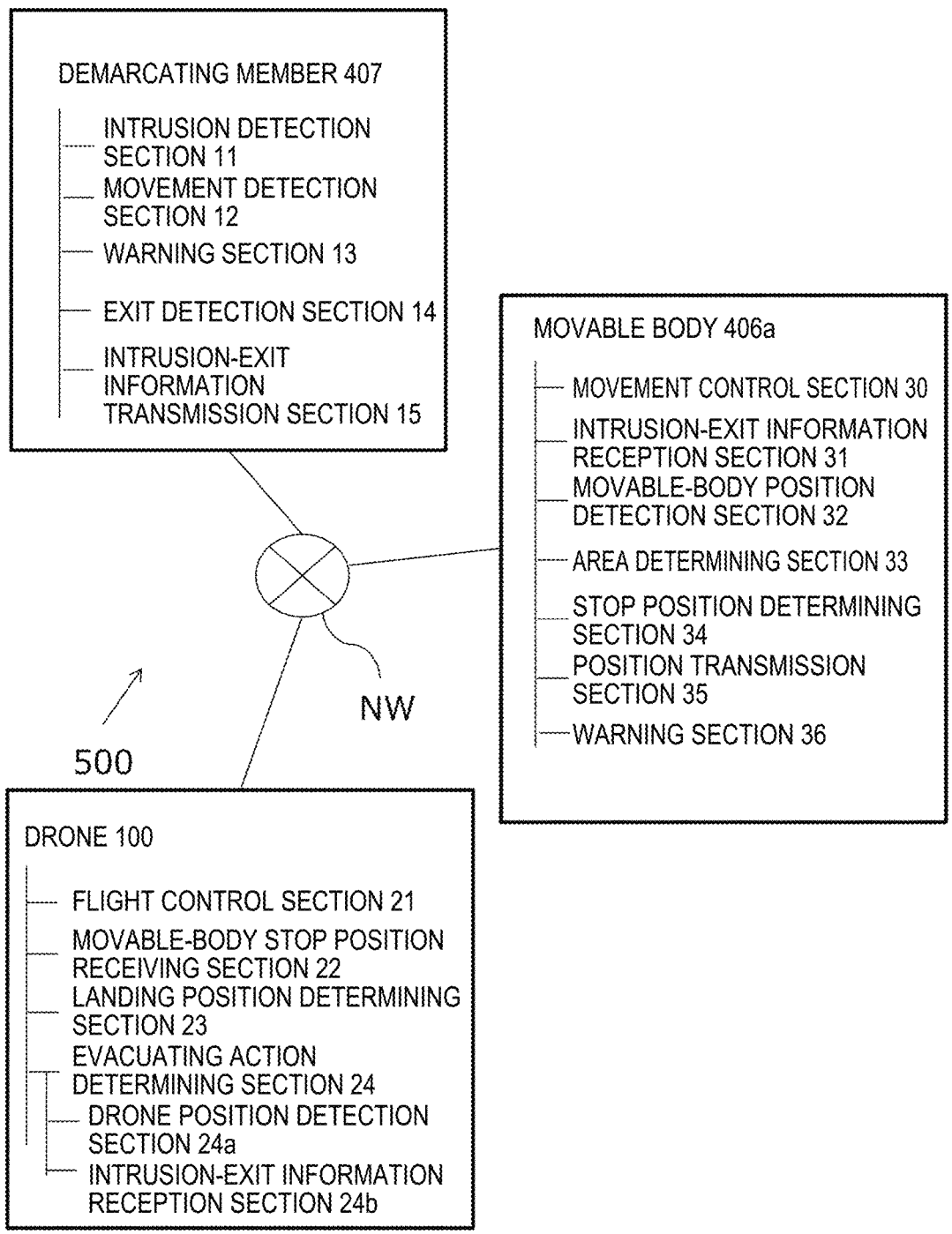
FIG. 13 is a functional block diagram concerning a function included in the demarcating member, the drone, and the movable body, the function being a function of detecting that an intruder intrudes into an automatic-traveling permitted area.

Outline of Functional Blocks Included in Demarcating Member, Drone, and Movable Body As illustrated in FIG. 13, the demarcating member 407 includes an intrusion detection section 11, a movement detection section 12, a warning section 13, an exit detection section 14, and an intrusion-exit information transmission section 15.

The intrusion detection section 11 is a functional section that detects that an intruder has intruded into the agricultural fields 403*a* and 403*b* or the automatic-driving permitted area 90, that is, the operation area. The intrusion detection section 11 includes, for example, a laser sensor such as an IR sensor.

The movement detection section 12 is a functional section that detects that the demarcating member 407 has been moved. The movement detection section 12 detects the movement of the demarcating member 407 based on, for example, a measurement value from a 6-axis gyro sensor included in the demarcating member 407 or a measurement value from RTK-GPS. The movement detection section 12 may include a sensor that detects a contact with the demarcating member 407.

The warning section 13 is a functional section that issues a warning based on the intrusion of an intruder detected by the intrusion detection section 11 or the movement of the demarcating member 407 detected by the movement detection section 12. The warning section 13 uses a display section, a sound emitting section, a light emitting section, or the like included in the demarcating member 407 itself to notify an intruder that the intruder is wanted to exit the operation area. Because an intruder passes the demarcating member 407 to intrude into the operation area, the intruder is likely to be close to the demarcating member 407 at the time of the intrusion. Thus, by causing the demarcating member 407 to issue a warning, the intruder can be notified of a warning.

The exit detection section 14 is a functional section that detects that an intruder has exited the operation area. The intrusion detection section 11 and the exit detection section 14 may share a single laser sensor. For example, the demarcating member 407 may include a plurality of laser sensors facing inward and outward of the operation area and may determine whether an intruder has intruded or exited based on an order of detection of the intruder with the laser sensors.

The intrusion-exit information transmission section 15 is a functional section that sends information indicating that there seems to be an intrusion into the operation area, the intrusion being detected by the intrusion detection section 11 and the movement detection section 12 (hereinafter, also referred to as "intrusion information"), to an intrusion-exit information reception section 31 described below, which is included in the movable body 406*a*. The intrusion information may be received by the drone 100, the operating device 401, or the small portable terminal 401*a*. The intrusion-exit information transmission section 15 may send the intrusion information after making the intrusion information contain specific information on the demarcating member 407 that has detected the intrusion. The specific information on the demarcating member 407 contains at least one of identification information for distinguishing among the plurality of demarcating member 407 and sets of position coordinates of the plurality of demarcating members 407. Here, the movable body 406*a* may store the sets of position coordinates at which the demarcating members 407 are arranged and pieces of the identification information on the demarcating members 407 in association with each another. That is, the specific information on the demarcating member 407 makes it possible to distinguish an entrance at which the intrusion has occurred from a plurality of entrances through which an intruder can intrude into the operation area.

The intrusion-exit information transmission section 15 sends information indicating that the intruder has exited the operation area, the exit being detected by the exit detection section 14 (hereinafter, also referred to as "exit information"), to an intrusion-exit information reception section 31 of the movable body 406a. The exit information may be received by the drone 100, the operating device 401, or the small portable terminal 401a and may be displayed on a display section of the operating device 401 or the small portable terminal 401a as appropriate. The intrusion-exit information transmission section 15 may send the exit information after making the exit information contain specific information on the demarcating member 407 that has detected the exit.

The movable body 406a includes a movement control section 30, the intrusion-exit information reception section 31, a movable-body position detection section 32, an area determining section 33, a stop position determining section 34, a position transmission section 35, and a warning section 36.

The movement control section 30 is a functional section that controls movement and stoppage of the movable body 406a. The movement control section 30 can cause the movable body 406a to move and stop autonomously within the automatic-driving permitted area 90 based on, for example, information on position coordinates and an ambient environment of the movable body 406a. In addition, the movement control section 30 can acquire, for example, information concerning a moving route from the agriculture cloud 405 and can cause, based on the information, the movable body 406a to move and stop. Note that the movement control section 30 may be controlled autonomously or may be controlled manually from a driver's seat of the movable body 406a or the outside of the movable body 406a.

The intrusion-exit information reception section 31 is a functional section that receives the intrusion information and the exit information sent from the demarcating member 407.

The movable-body position detection section 32 is a functional section that detects current position coordinates of the movable body 406a. The movable-body position detection section 32 detects position coordinates of the movable body 406a at a time when the intrusion information is received from the demarcating member 407. After the detection of an intruder, the movable-body position detection section 32 may detect the position coordinates of the movable body 406a continuously or periodically.

The area determining section 33 is a functional section that determines whether the movable body 406a is positioned within a region where the drone 100 can land on the movable body 406a, that is, a landing permitted area 902. The area determining section 33 determines the position of the movable body 406a at a time when an intruder is detected and may additionally determine the position of the movable body 406a continuously or periodically after the detection of the intruder. The area determining section 33 determines an area where the movable body 406a is located by comparing information on the landing permitted area 902 that is set in advance with the position coordinates of the movable body 406a obtained by RTK-GPS or the like. In a case where a stop position of the movable body 406a is determined, the area determining section 33 may additionally determine an area where the stop position is located.

The stop position determining section 34 is a functional section that determines the stop position of the movable body 406a in response to the reception of the intrusion information. When the intrusion information is received, the stop position determining section 34 causes the movable body 406a to stop. The stop position determining section 34 may stop the operation of the movable body 406a upon the reception of the intrusion information. With this configuration, it is possible to stop the operation immediately in a case where there is an intruder in the operation area, and thus a high safety can be guaranteed.

The stop position determining section 34 may determine the stop position based on an area where the movable body 406a is located at a time when the intrusion information is received, the area being determined by the area determining section 33. In a case where the movable body 406a is positioned within the movement permitted area 901, the stop position determining section 34 may determine that the movable body 406a is to move to and stop at a closest point in the landing permitted area 902. With this configuration, it is possible to cause the drone 100 returning from the agricultural field 403 to land on the movable body 406a reliably.

Moreover, based on the specific information on the demarcating member 407 included in the intrusion information, the stop position determining section 34 may determine that the movable body 406a is to move to and stop in the landing permitted area 902 when a distance between a current position of the movable body 406a and the demarcating member 407 that has detected the intrusion of an intruder is not less than a predetermined value. With this configuration, it is possible to increase a probability of causing the drone 100 to land on the movable body 406a successfully and to guarantee safety.

The position transmission section 35 is a functional section that sends a position at which the movable body 406a stops in accordance with the intrusion information to a movable-body stop position receiving section 22 of the drone 100. The position of the stop may be received by the operating device 401 and the small portable terminal 401a and may be displayed on the display sections of the operating device 401 and the small portable terminal 401a as appropriate. The position transmission section 35 may additionally send a type of an area where the stop position is located, the area being determined by the area determining section 33, that is, the information as to whether the stop position of the movable body 406a is within a region where the drone 100 can make a landing.

The warning section 36 is a functional section that issues a warning from the movable body 406a based on the intrusion information. The warning section 36 uses the alarm lamp 830 to notify a vicinity of the movable body 406a that an intruder has intruded into the operation area, with a warning sound or a warning display. The user 402 is likely to be in the vicinity of the movable body 406a to approach the trunk 821 of the movable body 406a. It is therefore possible to notify the user 402 of the intrusion information by issuing a warning with the movable body 406a.

The drone 100 includes the flight control section 21, the movable-body stop position receiving section 22, a landing position determining section 23, and an evacuating action determining section 24.

The flight control section 21 is a functional section that operates the motors 102 to control a flight, and a takeoff and a landing of the drone 100.

The movable-body stop position receiving section 22 is a functional section that receives the stop position of the movable body 406a sent from the position transmission section 35. The movable-body stop position receiving section 22 additionally receives information as to whether the stop position of the movable body 406a is within a region where the drone 100 can make a landing, that is, whether the stop position is located in the movement permitted area 901 or the landing permitted area 902. Note that in a case where the drone system 500 includes a plurality of movable bodies 406a, the movable-body stop position receiving section 22 receives pieces of identification information that makes movable bodies 406A and 406B identifiable as well as positions of the movable bodies 406A and 406B and types of areas where stop positions of the movable bodies 406A and 406B are located. The movable-body stop position receiving section 22 may receive only information on the position of the movable body 406A or 406B on which the drone 100 is to land and the type of the area where the position of the movable body 406A or 406B is located.

The landing position determining section 23 is a functional section that determines a position at which the drone 100 is to make a landing based on the stop position of the movable body 406a. The landing position determining section 23 refers to position coordinates at which the movable body 406a is stopping and determines that the drone 100 is to land on the movable body 406a at the position coordinates.

The landing position determining section 23 may determine the landing position based on a type of an area where the movable body 406a is stopping. In a case where the movable body 406a is stopping in the landing permitted area 902, the landing position determining section 23 determines that the drone 100 is to land on the movable body 406a at the position coordinates. In a case where the movable body 406a is stopping in the movement permitted area 901, the landing position determining section 23 determines that the drone 100 is to land not on the movable body 406a but in the vicinity of the movable body 406a. In the case where the movable body 406a is stopping in the movement permitted area 901, alternatively, the landing position determining section 23 may determine that the drone 100 is to land at a position from which the drone 100 has taken off.

While the drone 100 is flying, the landing position determining section 23 determines the landing position of the drone 100 at an exit point through which the drone is to exit the operation area of the drone 100, that is, the agricultural fields 403a and 403b. Alternatively, the landing position determining section 23 may determine the landing position of the drone 100 during an operation in the agricultural fields 403a and 403b. The landing position determining section 23 may perform a process of determining the landing position based on that the drone 100 is planned to make a landing or exit the agricultural fields 403a and 403b within a predetermined time.

Note that in the case where the drone system 500 includes a plurality of movable bodies 406a, the landing position determining section 23 may determine the landing position of the drone 100 based on the position or the type of the area at or in which the movable body 406A or 406B at which the landing of the drone 100 including the landing position determining section 23 is planned is stopping. In a case where the drone 100 cannot land on the movable body 406A or 406B at which the landing is planned, the landing position determining section 23 may determine that the drone 100 is to land on an alternate movable body 406B or 406A.

The evacuating action determining section 24 is a functional section that causes the flight control section 21 to take an evacuating action of the drone 100 in a case where there is an intruder within a predetermined range from the drone 100. Even when the movable body 406a stops moving due to the intrusion of the intruder, the drone 100 continues flying and performing an operation in the operation area. This is because a probability that the drone 100 comes into contact with the intruder having intruded into the automatic-driving permitted area 90 is low since the operation is performed by the drone 100 in the agricultural fields 403a and 403b. With this configuration, it is possible to execute an operation in the agricultural fields 403a and 403b even when an intruder intrudes. It is therefore possible to maintain an operational efficiency as compared with a configuration in which the operation is performed by the movable body 406a itself. However, in a case where the intruder is in the vicinity of the drone 100, the drone 100 needs to take the evacuating action. The evacuating action includes at least any one of hovering on the spot, flying away from a point through which the intruder intrudes, returning to the movable body 406a, and landing on the spot. Moreover, the evacuating action includes an action of directly or indirectly notifying the operating device 401 and the small portable terminal 401a of information indicating that the intruder is in the vicinity of the drone 100.

The evacuating action determining section 24 includes a drone position detection section 24a and an intrusion-exit information reception section 24b. The drone position detection section 24a is a functional section that detects current position coordinates of the drone 100. The intrusion-exit information reception section 24b is a functional section that receives the intrusion information and the exit information sent from the demarcating member 407. The intrusion information and the exit information each contain specific information on a demarcating member 407 at which the intrusion has occurred, that is, information that enables position coordinates of a point of the intrusion to be identified.

The evacuating action determining section 24 is a functional section that determines whether to cause the drone 100 to take an evacuating action, based on a current position of the drone 100 and the point of the intrusion. In a case where a distance between the current position of the drone 100 and the point of the intrusion is not less than a predetermined value, the evacuating action determining section 24 causes the drone 100 not to take the evacuating action, and the drone 100 continues performing the operation. In a case where the distance between the current position of the drone 100 and the point of the intrusion is less than the predetermined value, the evacuating action determining section 24 causes the drone 100 to take the evacuating action. With the configuration of the evacuating action determining section 24, even when an intruder intrudes into the operation area, the drone 100 continues performing an operation as far as possible, and also the drone 100 takes the evacuating action when the drone 100 is close to the intruder, so that safety is guaranteed.

The present embodiment is configured such that the evacuating action determining section 24 is included in the drone 100; however, the evacuating action determining section 24 may be included in another configuration in the drone system 500 and configured to send a command to take the evacuating action to the drone 100.

When the movable body 406a is stopping in the landing permitted area 902, the drone 100 can land on the movable body 406a even in a case where an intruder intrudes into the operation area. Moreover, the drone 100 may be replenished with a battery 502 and chemical agent from the movable body 406a. Furthermore, the drone 100 may take off from the movable body 406a. With this configuration, it is possible to perform replenishment with a battery 502 and chemical agent even in a case where an intruder intrudes, so that an operational efficiency of the operation in the agricultural fields 403a and 403b can be maintained. That is, by adjusting the landing position of the drone in accordance with the stop position of the movable body 406a, it is possible to cause the drone to return to the movable body 406a and to be replenished with a battery 502 and chemical agent even in a case where the movable body 406a stops due to intrusion.

Flowchart

Figure 14:
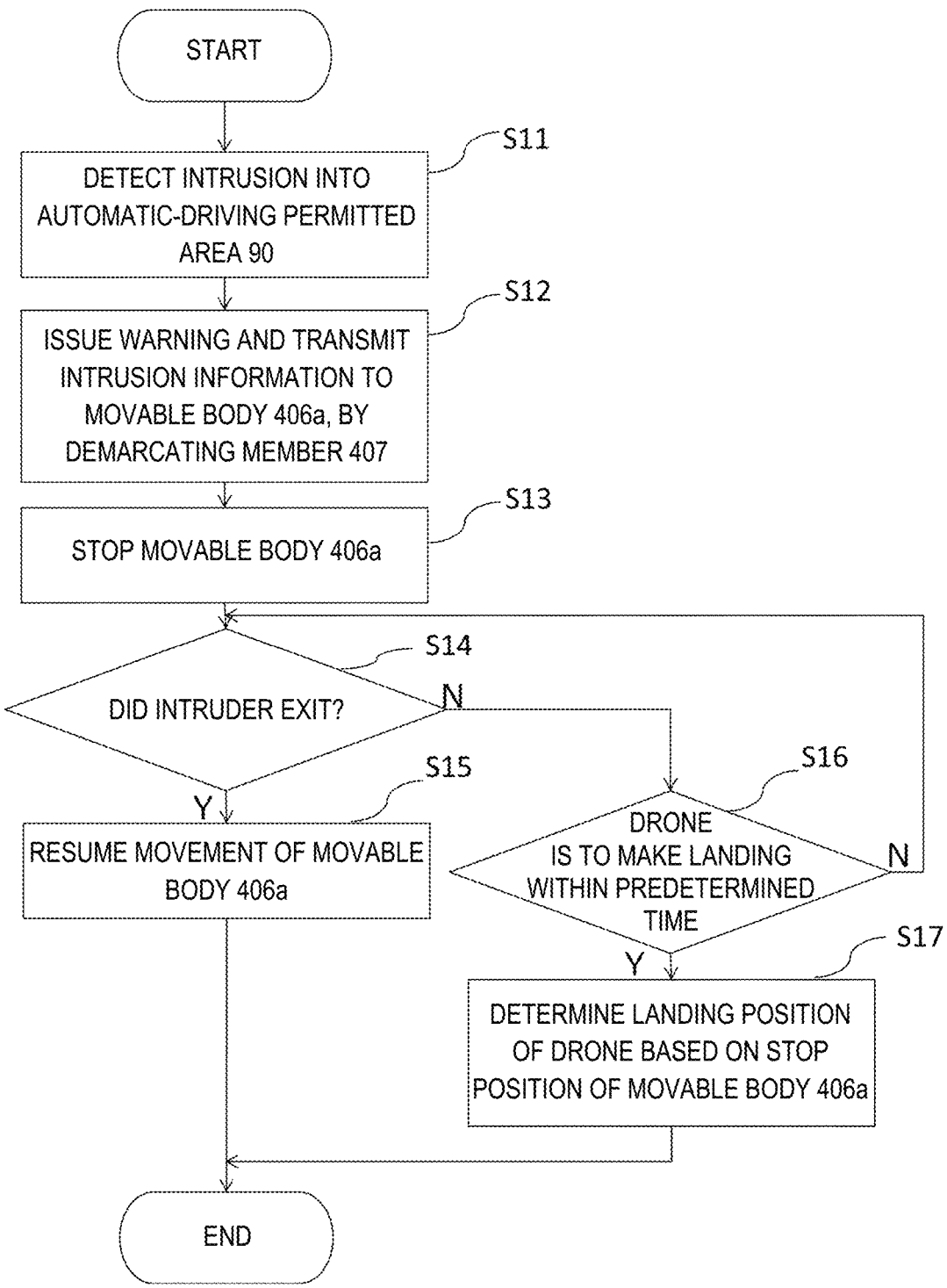
FIG. 14 is a flowchart of how the drone system detects an intruder and determines behavior of the movable body and the drone.

Behaviors of components having features in the embodiment described above will be described. As illustrated in FIG. 14, first, the intrusion detection section 11 of a demarcating member 407 detects that an intruder has intruded into the automatic-driving permitted area 90 (S11). Alternatively, in place of the intrusion detection section 11, the movement detection section 12 detects that the demarcating member 407 has been moved.

In response to the detection of the intruder, the demarcating member 407 issues a warning. In addition, the intrusion-exit information transmission section 15 of the demarcating member 407 sends intrusion information to the intrusion-exit information reception section 31 of the movable body 406a (S12).

Upon receiving the intrusion information, the movable body 406a stops moving (S13).

The exit detection section 14 of the demarcating member 407 determines whether the intruder has exited the operation area (S14). In a case where the exit of the intruder from the operation area is detected, the movable body 406a resumes moving (S15).

In a case where the intruder has not exited the operation area, the landing position determining section 23 of the drone 100 determines whether the drone 100 has reached the exit point (S16). In a case where the drone 100 has not reached the exit point and is performing an operation in the agricultural fields 403a and 403b, step S14 is returned to, and monitoring whether the intruder has exited is continued. In a case where the drone 100 has reached the exit point, the landing position determining section 23 determines a landing position of the drone 100 based on a stop position of the movable body 406a (S17).

Note that although the present description has been made about a drone for spreading an agricultural chemical agent as an example, a technical concept of the present invention is not limited to this example and is applicable generally to drones for other uses such as photographing and monitoring. In particular, the technical concept is applicable to machinery that operates autonomously. Furthermore, the movable body is not limited to a vehicle and may have any appropriate configuration.

(Technically Advantageous Effects of the Invention of the Present Application)

In the drone system according to the present invention, which is a system including a drone that executes a predetermined operation through automatic flight and a movable body that transports the drone, it is possible to minimize the stoppage of the operation by the drone even in a case where there is an intruder in an area where the movable body is allowed to travel automatically, so that an operational efficiency of the drone can be improved.

The invention claimed is:

1. A drone system in which a drone and a movable body operate in coordination with each other, the movable body being capable of moving with the drone aboard and allowing the drone to make a takeoff and a landing, the drone system comprising:
   a demarcating member, which is separate from the drone and the movable body, and that demarcates an operation area where at least one of the drone and the movable body performs an operation, the demarcating member for detecting an intruder into the operation area, wherein
   the movable body includes a movement control section that stops movement of the movable body based on the detection of the intruder by the demarcating member, and
   the drone includes a landing position determining section that determines a landing position based on a stop position of the movable body.

2. The drone system according to claim 1, wherein the demarcating member further includes an exit detection section that detects that the intruder exits the operation area, and
   the movement control section resumes the movement of the movable body in response to the exit of the intruder.

3. The drone system according to claim 1, wherein the drone system comprises a plurality of the demarcating members, and
   the demarcating member each send, to the movable body, information indicating that at least any one of intrusion and exit of the intruder is detected, together with specific information on the demarcating member that detects the intrusion.

4. The drone system according to claim 1, wherein the drone further includes a landing position determining section that determines whether the stop position of the movable body is within a region where the drone is able to land on the movable body and that determines that the drone is to land on the movable body in a case where the stop position is within the region where the drone is able to land on the movable body.

5. The drone system according to claim 4, wherein the landing position determining section determines that the drone is to land at a point other than the movable body in a case where the movable body stops at a position where the drone is unable to land on the movable body.

6. The drone system according to claim 4, wherein the landing position determining section determines a landing position of the drone at an exit point through which the drone exits the operation area of the drone.

7. The drone system according to claim 4, wherein
   the drone system comprises a plurality of the movable bodies, and
   the landing position determining section determines whether a stop position of one of the movable bodies on which the drone is to make a landing is within a region where the drone is able to make the landing.

8. The drone system according to claim 1, wherein
   the demarcating member further includes a movement detection section that detects that the demarcating member is moved, and
   the movable body stops moving in accordance with the movement of the demarcating member.

9. The drone system according to claim 1, wherein
   the movable body further includes:
   an area determining section that determines whether a position of the movable body is within a region where the drone is able to land on the movable body; and
   a stop position determining section that determines that the movable body is to move to a position where the drone is able to land on the movable body when a distance between the demarcating member that detects the intrusion of the intruder and the movable body is not less than a predetermined value in a case where the movable body is out of a region where the drone is able to land on the movable body.

10. The drone system according to claim 1, wherein
the movable body determines whether a distance between the demarcating member that detects intrusion of the intruder and the movable body is not less than a predetermined value, and
the movement control section causes the movable body to move to and stop at a position where the drone is able to land on the movable body when a distance between the demarcating member that detects the intrusion of the intruder and the movable body is not less than a predetermined value in a case where the stop position is out of the region where the drone is able to land on the movable body.

11. The drone system according to claim 1, wherein
the drone further includes an evacuating action determining section that determines that the drone is to take an evacuating action, and
when a distance between the drone and the demarcating member that detects intrusion of the intruder is less than a predetermined value, the evacuating action determining section determines that the drone is to take an evacuating action, and when the distance between the drone and the demarcating member that detects the intrusion of the intruder is not less than the predetermined value, the evacuating action determining section causes the drone to continue an operation.

12. The drone system according to claim 1, further comprising
a portable terminal capable of issuing a warning to a user, wherein
the portable terminal notifies, when the demarcating member detects at least any one of intrusion and exit of the intruder, the user of the detection.

13. The drone system according to claim 1, wherein the demarcating member and the movable body each further include a warning section that issues a warning of intrusion of the intruder.

14. A control method for a drone system in which a drone and a movable body operate in coordination with each other, the movable body being capable of moving with the drone aboard and allowing the drone to make a takeoff and a landing,
the drone system including a demarcating member, which is separate from the drone and the movable body, and that demarcates an operation area where at least one of the drone and the movable body performs an operation, the control method comprising:
a step of detecting, by the demarcating member, an intruder into the operation area where at least one of the drone and the movable body performs an operation;
a step of stopping movement of the movable body based on the detection of the intruder; and
a step of determining a landing position of the drone based on a stop position of the movable body.

15. A non-transitory computer readable storage medium storing thereon a control program for a drone system in which a drone and a movable body operate in coordination with each other, the movable body being capable of moving with the drone aboard and allowing the drone to make a takeoff and a landing,
the drone system including a demarcating member, which is separate from the drone and the movable body, and that demarcates an operation area where at least one of the drone and the movable body performs an operation,
the control program causing a computer to execute:
a command to detect, by the demarcating member, an intruder into the operation area where at least one of the drone and the movable body performs an operation;
a command to stop movement of the movable body based on the detection of the intruder; and
a command to determine a landing position of the drone based on a stop position of the movable body.

16. A movable body that is included in a drone system in which a drone and the movable body operate in coordination with each other, the movable body being capable of moving with the drone aboard and allowing the drone to make a takeoff and a landing,
the drone system including a demarcating member, which is separate from the drone and the movable body, and that demarcates an operation area where at least one of the drone and the movable body performs an operation, the demarcating member for detecting an intruder into the operation area,
the movable body comprising a movement control section that stops movement of the movable body based on the detection of the intruder by the demarcating member.

17. A drone that is capable of being moved by being aboard a movable body and capable of taking off from and landing on the movable body, the drone comprising:
a demarcating member, which is separate from the drone and the movable body, and that demarcates an operation area where at least one of the drone and the movable body performs an operation, the demarcating member for detecting an intruder into the operation area, wherein
the movable body stops movement of the movable body based on the detection of the intruder by the demarcating member, and
the drone includes a landing position determining section that determines a landing position based on a stop position of the movable body.

18. A entrance detecting system for a drone system, the drone system including:
a drone;
a movable body that is capable of moving with the drone aboard and allows the drone to make a takeoff and a landing; and
a demarcating member, which is separate from the drone and the movable body, and that demarcates an operation area where at least one of the drone and the movable body performs an operation, wherein the demarcating member detects an intruder into the operation area, and wherein
the demarcating member includes
an intrusion-exit information transmission section that sends, to the movable body, information on at least any one of intrusion and exit of the intruder into and from the operation area.

* * * * *